United States Patent
Nagai et al.

(10) Patent No.: US 10,226,743 B2
(45) Date of Patent: Mar. 12, 2019

(54) GAS SEPARATION COMPOSITE MEMBRANE, GAS SEPARATION MODULE, GAS SEPARATION DEVICE, GAS SEPARATION METHOD, AND METHOD OF PRODUCING GAS SEPARATION COMPOSITE MEMBRANE

(71) Applicant: FUJIFILM Corporation, Tokyo (JP)

(72) Inventors: Takayasu Nagai, Ashigarakami-gun (JP); Daisuke Sawai, Ashigarakami-gun (JP); Satoshi Sano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 15/201,663

(22) Filed: Jul. 5, 2016

(65) Prior Publication Data

US 2016/0310911 A1    Oct. 27, 2016

Related U.S. Application Data

(63) Continuation of application No. PCT/JP2015/052886, filed on Feb. 2, 2015.

(30) Foreign Application Priority Data

Feb. 12, 2014  (JP) .................. 2014-024632

(51) Int. Cl.
*B01D 53/22* (2006.01)
*B01D 71/64* (2006.01)
(Continued)

(52) U.S. Cl.
CPC ........... *B01D 71/64* (2013.01); *B01D 53/228* (2013.01); *B01D 65/003* (2013.01);
(Continued)

(58) Field of Classification Search
CPC ............... B01D 67/0006; B01D 71/64; B01D 2323/30; B01D 2257/504; B01D 65/003;
(Continued)

(56) References Cited

U.S. PATENT DOCUMENTS

| 4,720,539 A | * | 1/1988 | Rabilloud | .......... | C08G 73/1042 |
| | | | | | 528/353 |
| 4,900,449 A | * | 2/1990 | Kraus | ............... | B01D 67/0011 |
| | | | | | 210/500.39 |

(Continued)

FOREIGN PATENT DOCUMENTS

| JP | 63-93326 A | 4/1988 |
| JP | 3-42026 A | 2/1991 |

(Continued)

OTHER PUBLICATIONS

Perry "Perrys-Chemical-Engineers-handbook" 1999, 7th ed., p. 22-38.*

(Continued)

*Primary Examiner* — Anthony R Shumate
(74) *Attorney, Agent, or Firm* — Sughrue Mion, PLLC

(57) ABSTRACT

Provided are a gas separation composite membrane including a gas separation layer which is formed to include a polyimide compound on the upper side of a gas permeating support, in which the solubility of the polyimide compound in dimethylacetamide at 20° C. is 20 mg/100 g or less, and the thickness of the gas separation layer is 0.1 μm or greater and less than 5.0 μm, a method of producing the same, a gas separation module using the gas separation composite membrane, a gas separation device, and a gas separation method.

7 Claims, 1 Drawing Sheet

(51) Int. Cl.
*B01D 69/12* (2006.01)
*C08G 73/10* (2006.01)
*B01D 65/00* (2006.01)
*B32B 37/06* (2006.01)
*B32B 38/10* (2006.01)
*B01D 67/00* (2006.01)
*B32B 37/12* (2006.01)

(52) U.S. Cl.
CPC ......... *B01D 67/0006* (2013.01); *B01D 69/12* (2013.01); *B32B 37/06* (2013.01); *B32B 37/1292* (2013.01); *B32B 38/10* (2013.01); *C08G 73/10* (2013.01); *C08G 73/1007* (2013.01); *C08G 73/1039* (2013.01); *C08G 73/1042* (2013.01); *C08G 73/1067* (2013.01); *B01D 2257/504* (2013.01); *B01D 2323/30* (2013.01); *B01D 2325/04* (2013.01); *B32B 2307/724* (2013.01); *B32B 2309/02* (2013.01); *Y02C 10/10* (2013.01); *Y02P 20/152* (2015.11)

(58) Field of Classification Search
CPC .. B01D 2325/04; B01D 69/12; B01D 53/228; Y02C 10/10; Y02P 20/152; C08G 73/1007; C08G 73/10; C08G 73/1067; C08G 73/1039; C08G 73/1042; B32B 37/06; B32B 38/10; B32B 2309/02; B32B 37/1292; B32B 2307/724

See application file for complete search history.

(56) References Cited

U.S. PATENT DOCUMENTS

| | | | | | |
|---|---|---|---|---|---|
| 4,964,990 | A | * | 10/1990 | Kraus | B01D 67/0011 210/490 |
| 5,104,968 | A | * | 4/1992 | Gonzalez | C08G 73/1003 428/411.1 |
| 5,108,607 | A | * | 4/1992 | Kraus | B01D 67/0011 210/500.39 |
| 5,346,979 | A | * | 9/1994 | Okinoshima | C08G 73/101 525/431 |
| 5,807,406 | A | * | 9/1998 | Brauker | A61F 2/00 424/422 |
| 6,383,386 | B1 | * | 5/2002 | Hying | B01D 53/228 210/490 |
| 9,700,849 | B2 | * | 7/2017 | Hironaka | B01D 69/12 |
| 2003/0070545 | A1 | * | 4/2003 | Liu | B01D 53/228 95/45 |
| 2003/0164090 | A1 | * | 9/2003 | Ding | B01D 53/228 95/45 |
| 2005/0118479 | A1 | * | 6/2005 | Yamaguchi | B01D 67/0009 429/413 |
| 2009/0117454 | A1 | * | 5/2009 | Takita | B01D 69/02 429/145 |
| 2009/0286073 | A1 | * | 11/2009 | Hamano | C09J 7/0282 428/337 |
| 2015/0258505 | A1 | * | 9/2015 | Hironaka | B01D 69/02 95/51 |
| 2017/0014754 | A1 | * | 1/2017 | Kasuya | B01D 53/228 |
| 2017/0333836 | A1 | * | 11/2017 | Kodama | B01D 53/228 |

FOREIGN PATENT DOCUMENTS

| | | |
|---|---|---|
| JP | 7-236822 A | 9/1995 |
| JP | 10-66847 A | 3/1998 |
| JP | 2007-297605 A | 11/2007 |
| JP | 2012-11361 A | 1/2012 |
| JP | 2013-27819 A | 2/2013 |
| JP | 2013-46902 A | 3/2013 |
| JP | 2013-46903 A | 3/2013 |
| JP | 2013-46904 A | 3/2013 |
| JP | 2013-169485 A | 9/2013 |
| JP | 2013-188742 A | 9/2013 |
| WO | 2009/091062 A1 | 7/2009 |

OTHER PUBLICATIONS

Machine Translation of JP 2013-27819 Satoshi, Feb. 7, 2013.*
International Search Report for PCT/JP2015/052886 dated Apr. 7, 2015 English Translation.

* cited by examiner

GAS SEPARATION COMPOSITE MEMBRANE, GAS SEPARATION MODULE, GAS SEPARATION DEVICE, GAS SEPARATION METHOD, AND METHOD OF PRODUCING GAS SEPARATION COMPOSITE MEMBRANE

CROSS-REFERENCE TO RELATED APPLICATIONS

This application is a Continuation of PCT International Application No. PCT/JP2015/052886 filed on Feb. 2, 2015, which claims priority under 35 U.S.C. § 119 (a) to Japanese Patent Application No. 2014-024632 filed on Feb. 12, 2014. The above application is hereby expressly incorporated by reference, in its entirety, into the present application.

BACKGROUND OF THE INVENTION

1. Field of the Invention

The present invention relates to a gas separation composite membrane, a gas separation module, a gas separation device, a gas separation method, and a method of producing a gas separation composite membrane.

2. Description of the Related Art

A material formed of a polymer compound has a gas permeability specific to the material. Based on this property, it is possible to cause selective permeation and separation out of a target gas component using a membrane formed of a specific polymer compound. As an industrial application for this gas separation membrane related to the problem of global warming, separation and recovery from large-scale carbon dioxide sources using this gas separation membrane has been examined in thermal power plants, cement plants, or ironworks blast furnaces. Further, this membrane separation technique has been attracting attention as a means for solving environmental issues which can be performed with relatively little energy. In addition, natural gas or biogas (gas generated due to fermentation or anaerobic digestion, for example, biological excrement, organic fertilizers, biodegradable substances, sewage, garbage, or energy crops) is a mixed gas mainly containing methane and carbon dioxide, and a membrane separation method is being examined as a means for removing impurity components such as the carbon dioxide and the like (JP2007-297605A).

When natural gas is purified using a membrane separation method, excellent gas permeability and separation selectivity are required in order to efficiently perform separation of gas. Various membrane materials have been examined in order to realize excellent gas permeability and separation selectivity, and a gas separation membrane using a polyimide compound has been examined as a specific example thereof.

Moreover, in an actual plant, a membrane is plasticized due to high pressure conditions and impurity components (for example, benzene, toluene, and xylene) present in natural gas and this leads to degradation of separation selectivity, which is problematic. In order to prevent plasticizing of the membrane, it is known that introduction of a cross-linked structure or a branched structure to a polyimide compound constituting the membrane is effective (for example, JP2013-188742A, JP2013-169485A, JP2013-046904A, JP2013-046903A, JP2013-046902A, and JP2013-027819A).

In order to obtain a practical gas separation membrane, it is necessary to ensure not only gas separation selectivity but also sufficient gas permeability by making a gas separation layer thinner. As a method for this, a method of making a portion contributing to separation into a thin layer referred to as a dense layer or a skin layer by forming a polymer compound such as a polyimide compound into an asymmetric membrane using a phase separation method may be exemplified. In this asymmetric membrane, a dense layer is used as a gas separation layer and a portion other than a dense layer is allowed to function as a support layer responsible for the mechanical strength of a membrane.

Further, in addition to an asymmetric membrane, a form of a composite membrane in which a substance responsible for a gas separation function is different from a substance responsible for the mechanical strength is also known. In this composite membrane, a gas separation layer formed of a polymer compound such as a polyimide is formed on a gas permeating support responsible for mechanical strength. As a method of producing such a composite membrane, a method of forming a gas separation layer by coating a gas permeating support with a coating solution prepared by dissolving a polymer compound such as a polyimide to form a film is known. In addition, a method of forming a composite membrane by preparing a dense layer formed of a polyimide compound separately from a gas permeating support and then disposing the dense layer on the gas permeating support as a gas separation layer is also known. For example, JP1995-236822A (JP-H07-236822A) describes a method of forming a composite membrane by forming a dense thin film of a polyimide compound on a glass plate, immersing this glass plate in pure water, peeling the thin film from the glass plate in water such that it floats on the surface of the water, scooping the thin film onto a gas permeating support, and drying the film.

It is known that a gas separation layer using a polyimide compound is insolubilized because a cross-linked structure is formed when it is subjected to a heat treatment at a high temperature and the gas separation performance thereof is thus improved (for example, WO2009/091062A). Further, a gas separation layer formed to include an insoluble polyimide compound is formed using a solution of polyamic acid, which is a precursor of a polyimide compound, or the like and can be prepared by this being subjected to a heat treatment at a high temperature for imidization.

SUMMARY OF THE INVENTION

The above-described method of forming a gas separation layer with an insoluble polyimide compound through a heat treatment at a high temperature can be readily applied to production of an asymmetric membrane or a hollow fiber membrane, but cannot be readily applied to production of a composite membrane. That is, in a gas separation composite membrane having a thin gas separation layer formed of a polyimide compound on a gas permeating support responsible for mechanical strength, the gas permeating support does not have a sufficient heat resistance to withstand the above-described heat treatment process. Accordingly, the gas permeating support is melted or decomposed by the heat treatment.

An object of the present invention is to provide a gas separation composite membrane which has a gas separation layer formed of an insoluble polyimide compound, exhibits excellent gas permeability and gas separation selectivity even under high pressure conditions, and is unlikely to undergo plasticization of a film due to the influence of impurity components such as toluene present in natural gas, and a method of producing the same. Further, another object of the present invention is to provide a gas separation module using the above-described gas separation membrane, a gas separation device, and a gas separation method.

The present inventors conducted intensive research to solve the above-described problems. As a result, the present inventors found that a gas separation composite membrane having a uniform polyimide thin film can be prepared on a gas permeating support by applying a heat treatment to a polyimide thin film or a polyimide precursor thin film formed on a heat-resistant support such that it is made insolubilized at the time of preparation of a gas separation composite membrane and bonding this insolubilized polyimide thin film to the gas permeating support. Further, the present inventors found that this gas separation composite membrane exhibits excellent gas permeability and gas separation selectivity even under high pressure conditions and is unlikely to be affected by impurity components such as toluene present in natural gas. The present invention has been realized by conducting intensive research based on this knowledge.

According to the present invention, the following means is provided.

[1] A gas separation composite membrane comprising: a gas separation layer which is formed to include a polyimide compound on the upper side of a gas permeating support, in which the solubility of the polyimide compound in dimethylacetamide at 20° C. is 20 mg/100 g or less, and the thickness of the gas separation layer is 0.1 μm or greater and less than 5.0 μm.

[2] The gas separation composite membrane according to [1], further comprising an adhesive layer on at least a portion between the gas separation layer and the gas permeating support.

[3] The gas separation composite membrane according to [1] or [2], in which the gas permeating support is an organic porous support.

[4] The gas separation composite membrane according to any one of [1] to [3], in which the gas separation layer is subjected to a heat treatment at 200° C. or higher during a process of preparing the gas separation layer.

[5] The gas separation composite membrane according to any one of [1] to [4], in which the gas separation composite membrane allows carbon dioxide to selectively permeate from gas containing carbon dioxide and methane.

[6] A gas separation module comprising the gas separation composite membrane according to any one of [1] to [5].

[7] A gas separation device comprising the gas separation module according to [6].

[8] A gas separation method comprising: allowing carbon dioxide to selectively permeate from gas containing carbon dioxide and methane using the gas separation membrane according to any one of [1] to [5].

[9] A method of producing a gas separation composite membrane according to any one of [1] to [5], comprising the following processes (a) to (c); (a) a process of forming a film which is formed to include an insoluble polyimide compound on a heat-resistant support by applying a heat treatment at 200° C. or greater to the entire heat-resistant support on which a film formed to include a polyimide compound that is insolubilized through a heat treatment at 200° C. or higher and a polyimide precursor is formed; (b) a process of bonding a gas permeating support to the film which is formed on the heat-resistant support and formed to include the insoluble polyimide compound; and (c) a process of peeling off the heat-resistant support.

[10] The production method according to [9], in which the film which is formed on the heat-resistant support and formed to include a polyimide compound insolubilized through the heat treatment at 200° C. or higher and a polyimide precursor is prepared by coating the heat-resistant support with a solution containing the polyimide compound insolubilized through the heat treatment at 200° C. or higher and the polyimide precursor and drying the heat-resistant support.

[11] The production method according to [9], in which the film which is formed on the heat-resistant support and formed to include a polyimide compound insolubilized through the heat treatment at 200° C. or higher and a polyimide precursor is prepared by bonding the heat-resistant support to a film, formed by coating a substrate with a solution containing the polyimide compound insolubilized through the heat treatment at 200° C. or higher and the polyimide precursor and drying the substrate, and peeling off the base substrate.

[12] The production method according to any one of [9] to [11], in which the gas permeating support is an organic porous support.

[13] The production method according to any one of [9] to [12], in which the process (b) is a process of bonding the gas permeating support to the film which is formed on the heat-resistant support and formed to include an insoluble polyimide compound after double-sided tape or an adhesive is provided on at least a portion of the film.

[14] The production method according to any one of [9] to [13], in which the entire peeling process is performed in water.

[15] The production method according to any one of [9] to [14], in which the polyimide compound insolubilized through the heat treatment at 200° C. or higher includes a repeating unit represented by the following Formula (I):

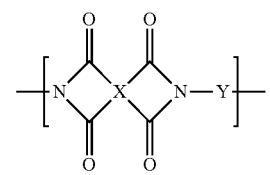

Formula (I)

In Formula (I), X represents a group having a structure represented by any of the following Formulae (I-1) to (I-28). $X^1$ to $X^3$ represent a single bond or a divalent linking group, L represents —CH=CH— or —CH$_2$—, $R^1$ and $R^2$ represent a hydrogen atom or a substituent group, and the symbol "*" represents a binding site. Y represents an arylene group.

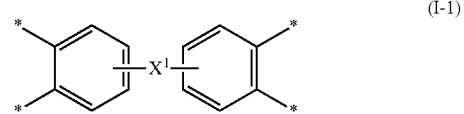

(I-1)

(I-2)

(I-3)

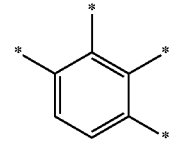

-continued
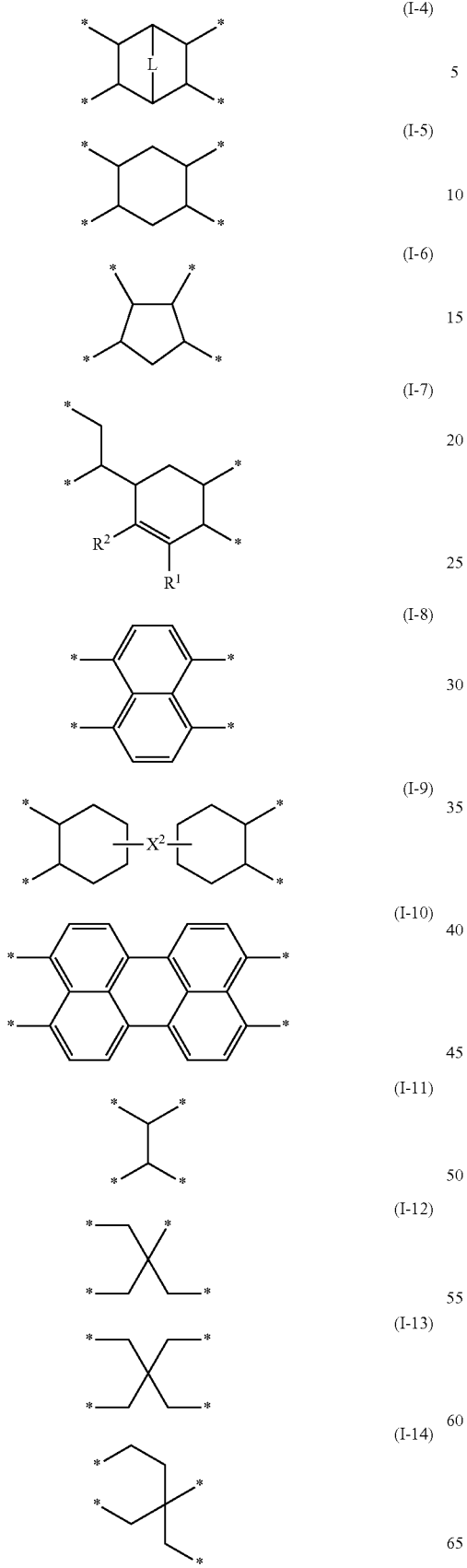
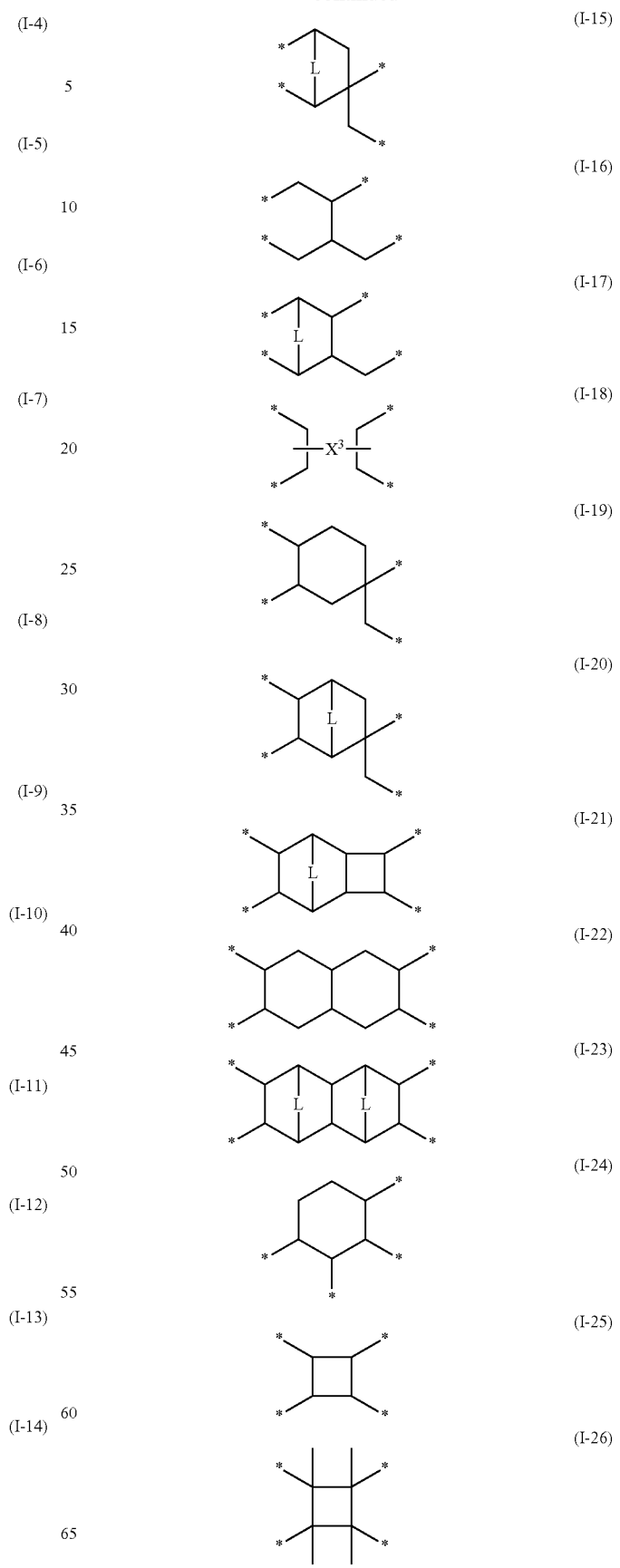

-continued

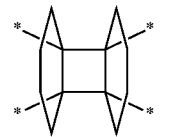
(I-27)

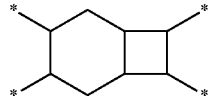
(I-28)

[16] The production method according to any one of [9] to [14], in which the polyimide precursor insolubilized through the heat treatment at 200° C. or higher includes a repeating unit represented by the following Formula (II):

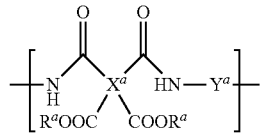
Formula (II)

In Formula (II), $X^a$ represents a tetravalent aliphatic group, a tetravalent aromatic group, or a tetravalent group formed by combining one or two or more selected from aliphatic groups and aromatic groups. $Y^a$ represents a divalent aliphatic group, a divalent aromatic group, or a divalent group formed by combining one or two or more selected from aliphatic groups and aromatic groups. $R^a$ represents a hydrogen atom, an alkyl group having 1 to 6 carbon atoms, or an alkylsilyl group having 3 to 9 carbon atoms.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. The same applies to the definition of the number of substituent groups or the like. Moreover, in a case where there is a repetition of a plurality of partial structures shown by means of the same display in the formula, the respective partial structures or repeating units may be the same as or different from each other. In addition, even in a case where not specifically stated, when a plurality of substituent groups or the like are adjacent to each other, this means that they may be condensed or linked to each other and form a ring.

In regard to compounds described in the present specification, the description includes salts thereof and ions thereof in addition to the compounds. Further, the description includes structures formed by changing a part of the structure within a range in which target effects are exhibited.

A group in which substitution or non-substitution is not specified in the present specification may include a substituent group of the group within a range in which desired effects are exhibited. The same applies to a compound in which substitution or non-substitution is not specified.

A preferable range of a group Z of substituent groups described below is set as a preferable range of a substituent group in the present specification unless otherwise specified.

The gas separation composite membrane of the present invention has a gas separation layer including an insoluble polyimide compound. Accordingly, even when the gas separation membrane is used under high pressure conditions or used for separation of gas containing impurity components such as toluene, the gas separation performance is unlikely to be degraded.

Moreover, the gas separation module and the gas separation device of the present invention include the gas separation composite membrane of the present invention, have excellent gas permeability, and exhibit excellent gas separation performance. In addition, even when the gas separation module and the gas separation device are used under high pressure conditions or used for separation of gas containing impurity components such as toluene, the gas separation performance is unlikely to be degraded.

According to the gas separation method of the present invention, it is possible to separate carbon dioxide from gas containing carbon dioxide and methane with higher permeability and higher selectivity. In addition, even when a gas is separated under high pressure conditions or impurity components are present in the gas, the above-described excellent gas separation performance is maintained.

According to the production method of the present invention, it is possible to produce a gas separation composite membrane having a gas separation layer that includes an insoluble polyimide compound. Even when the gas separation composite membrane obtained by the production method of the present invention is used under high pressure conditions or used for separation of gas containing impurity components such as toluene, the gas separation performance is unlikely to be degraded.

The above-described and other features and advantages of the present invention will become apparent with reference to the accompanying drawings.

DESCRIPTION OF THE PREFERRED EMBODIMENTS

[Gas Separation Composite Membrane]
<Structure of Gas Separation Composite Membrane>

A gas separation composite membrane (hereinafter, also simply referred to as a "composite membrane") of the present invention has a gas separation layer, which is formed to include an insoluble polyimide compound, on the upper side of a gas permeating support (layer).

The expression "on the upper side of the gas permeating support" in the present specification means that another layer may be interposed between the gas permeating support and the gas separation layer. Further, in regard to the expressions related to up and down, the direction in which gas to be separated is supplied to is set as "up" and the direction in which the separated gas is discharged is set as "down" unless otherwise specified.

In the gas separation composite membrane of the present invention, a polyimide compound contained in the gas separation layer is insoluble. The expression "insoluble" polyimide compound (hereinafter, also referred to as an "insoluble polyimide compound") in the present specification indicates a polyimide compound having a solubility of 20 mg/100 g or less in diacetylamide at 20° C. (that is, the amount of polyimide compound to be dissolved in 100 g of diacetylamide at 20° C. is 20 mg or less). In the gas separation composite membrane of the present invention, the solubility of the insoluble polyimide compound, which is contained in the gas separation layer, in diacetylamide at 20° C. is preferably 15 mg/100 g or less and more preferably 10 mg/100 g or less. Further, in the gas separation composite membrane of the present invention, the solubility of the insoluble polyimide compound, which is contained in the gas separation layer, in diacetylamide at 20° C. may be 0 mg/100, but is typically 0.1 mg/100 g or greater.

Figure 1:
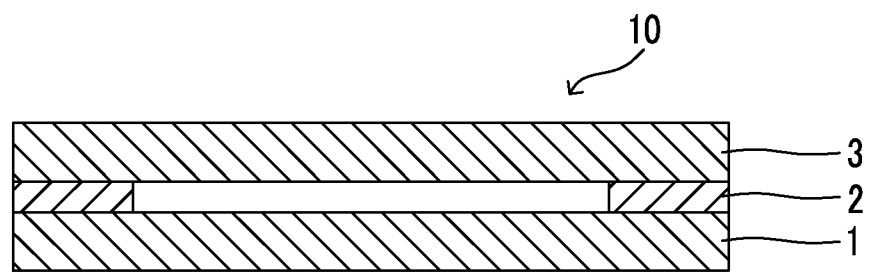
FIG. 1 is a sectional view schematically illustrating an embodiment of a gas separation composite membrane of the present invention.

FIG. 1 is a sectional view schematically illustrating a composite membrane 10 according to a preferred embodiment of the present invention. The composite membrane of FIG. 1 is configured of a gas permeating support (1), an adhesive layer (2), and a gas separation layer (3). The composite membrane of the present invention may be in the form in which the gas separation layer (3) is directly bonded to the gas permeating support (1), but the form in which the adhesive layer (2) is provided with the gas permeating support and the gas separation layer is preferable from the viewpoint of a production process.

Since the gas separation layer becomes excellent in gas permeability while maintaining the mechanical strength and separation selectivity, it is preferable that the thickness of the gas separation layer is as thin as possible. When the thickness of the gas separation layer is extremely large, the gas permeability of the gas separation composite membrane is degraded so that the practicality becomes inferior.

In the gas separation composite membrane of the present invention, the thickness of the gas separation layer is 0.1 µm or greater and less than 5.0 and preferably in a range of 0.1 µm to 2.0 µm.

Moreover, the content of the insoluble polyimide compound in the gas separation layer is not particularly limited as long as desired gas separation performance can be obtained. From the viewpoint of further improving the gas separation performance, the content of the insoluble polyimide compound in the gas separation layer is preferably 20% by mass or greater, more preferably 40% by mass or greater, still more preferably 60% by mass or greater, and particularly preferably 70% by mass or greater. Further the content of the polyimide compound in the gas separation layer may be 100% by mass, but is typically 98% by mass or less.

It is preferable that the gas permeating support is a porous support. The material of the porous support which is preferably applied to the gas permeating support is not particularly limited and may be an organic or inorganic material as long as the material satisfies the purpose of providing mechanical strength and high gas permeability. It is preferable that the gas permeating support is a porous membrane (organic porous support) of an organic polymer. The thickness thereof is preferably in a range of 1 µm to 3000 µm, more preferably in a range of 5 µm to 500 µm, and still more preferably in a range of 5 µm to 150 µm.

In regard to the pore structure of the porous support, the average pore diameter is preferably 10 µm or less, more preferably 0.5 µm or less, and still more preferably 0.2 µm or less. The porosity is preferably in a range of 20% to 90% and more preferably in a range of 30% to 80%.

Further, the molecular weight cut-off of the porous layer is preferably 100,000 or less. Moreover, the gas permeability is preferably $3 \times 10^{-5}$ cm$^3$ (STP)/cm$^2$·sec·cmHg (30 GPU) or greater, more preferably 100 GPU or greater, still more preferably 200 GPU or greater, and even still more preferably 1000 GPU or greater in terms of the permeation rate of carbon dioxide at 40° C. and 4 MPa.

Examples of the material of the porous support include known polymers of the related art, for example, various resins such as a polyolefin resin such as polyethylene or polypropylene; a fluorine-containing resin such as polytetrafluoroethylene, polyvinyl fluoride, or polyvinylidene fluoride; polystyrene, acetic acid cellulose, polyurethane, polyacrylonitrile, polyphenylene oxide, polysulfone, polyether sulfone, polyimide, and polyaramid. As the shape of the porous membrane, any of a flat shape, a spiral shape, a tabular shape, and a hallow fiber shape can be employed.

In the composite membrane of the present invention, another porous support used to provide mechanical strength may be formed in the lower portion of the support layer. Examples of such a porous support include woven fabric, non-woven fabric, and a net. In terms of film forming properties and the cost, non-woven fabric is preferably used. As the non-woven fabric, fibers formed of polyester, polypropylene, polyacrylonitrile, polyethylene, polyamide, and the like may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

The adhesive layer has adhesion to both of the gas permeating support and the gas separation layer and plays a role of further strengthening the adhesion between the gas permeating support and the gas separation layer. In the preparation of the gas separation composite membrane of the present invention, as described below, this adhesive layer is derived from double-sided tape or an adhesive (the meaning of the "adhesive" in the present specification includes a pressure sensitive adhesive) used when the gas permeating support is bonded to the gas separation layer formed on the heat-resistant support.

The adhesive layer is not particularly limited as long as the layer has a function of adhesion to both of the gas permeating support and the gas separation layer and can be configured of various adhesives. Further, the adhesive layer may be configured of double-sided tape having adhesive layers on both surfaces of a base material sheet. A known adhesive of the related art can be used as the above-described adhesive. Examples of the known adhesive of the related art include synthetic adhesives such as a styrene-butadiene copolymer, a styrene-acrylic copolymer, an ethylene-vinyl acetate copolymer, a butadiene-methyl methacrylate copolymer, a vinyl acetate-butyl acrylate copolymer, polyvinyl alcohol, a maleic anhydride copolymer, and an acrylic acid-methyl methacrylate copolymer.

It is preferable that the adhesive layer is provided on at least a portion of a surface formed by bonding the gas permeating support and the gas separation layer to each other and more preferable that the adhesive layer is provided on the outer peripheral portion of the surface formed by bonding the gas permeating support and the gas separation layer to each other as illustrated in FIG. 1. When the adhesive layer is provided on the outer peripheral portion of the surface formed by bonding the gas permeating support and the gas separation layer to each other, it is possible to prevent the function of separating gas from being inhibited by the adhesive layer. In the surface formed by bonding the gas permeating support and the gas separation layer to each other, the area of the outer peripheral portion on which the adhesive layer is provided to the area of the entire bonding surface [area of outer peripheral portion]/[area of entire bonding surface] is preferably in a range of 1/100 to 30/100 and more preferably in a range of 2/100 to 20/100. Further, it is preferable that the width of the outer peripheral portion of the bonding surface is uniform, but the width thereof may be non-uniform.

<Method of Producing Gas Separation Composite Membrane>

It is preferable that the method of producing the composite membrane of the present invention includes the following processes (a) to (c).

(a) a process of forming a film which is formed to include an insoluble polyimide compound on a heat-resistant support by applying a heat treatment at 200° C. or higher to the entire heat-resistant support on which a film formed to include a polyimide compound that is insolubilized through a heat treatment at 200° C. or higher and a polyimide precursor is formed;

(b) a process of bonding a gas permeating support to the film which is formed on the heat-resistant support and formed to include the insoluble polyimide compound; and (c) a process of peeling off the heat-resistant support.

—Process (a)—

In the process (a), a material which is not melted by the heat treatment at 200° C. or higher during the process (a) is used as the heat-resistant support used as a substrate for forming a film. Examples of such a heat-resistant support include a glass substrate, a fluorine resin substrate (for example, polytetrafluoroethylene (PTFE) substrate), a polyimide substrate, a metal substrate such as SUS, Al, or silicon, and an organic polymer substrate having a glass transition temperature of 250° C. or higher. From the viewpoints of coating properties and peeling properties, it is preferable to use a glass substrate.

The thickness of the heat-resistant support is not particularly limited, but is preferably in a range of 50 μm to 5000 μm and more preferably in a range of 100 μm to 2000 μm from the viewpoint of suppressing generation of a defect in the gas separation layer caused by bending or cracking of the heat-resistant support.

It is preferable that a film which is formed on the heat-resistant support and formed to include a polyimide compound insolubilized through the heat treatment at 200° C. or higher and a polyimide precursor is prepared by coating the heat-resistant support with a solution (coating solution) containing the polyimide compound insolubilized through the heat treatment at 200° C. or higher and the polyimide precursor and drying the heat-resistant support.

Here, the polyimide precursor is polyamic acid or a derivative thereof and is a compound that closes a ring when heated at 200° C. or higher during the process (a) and generates a polyimide compound.

The content (concentration) of the polyimide compound or the polyimide precursor in a solution dissolved in an organic solvent is not particularly limited, but is preferably in a range of 0.1% by mass to 30% by mass and more preferably in a range of 0.5% by mass to 20% by mass, in order to form a thin film without a defect in the film.

A medium of the coating solution is an organic solvent. The organic solvent is not particularly limited, and examples thereof include a hydrocarbon-based organic solvent such as n-hexane or n-heptane; an ester-based organic solvent such as methyl acetate, ethyl acetate, or butyl acetate; lower alcohol such as methanol, ethanol, n-propanol, isopropanol, n-butanol, isobutanol, or tert-butanol; an aliphatic ketone-based organic solvent such as acetone, methyl ethyl ketone, methyl isobutyl ketone, diacetone alcohol, cyclopentanone, or cyclohexanone; an ether-based organic solvent such as ethylene glycol, diethylene glycol, triethylene glycol, glycerin, propylene glycol, ethylene glycol monomethyl ether, ethylene glycol monoethyl ether, propylene glycol methyl ether, dipropylene glycol methyl ether, tripropylene glycol methyl ether, ethylene glycol phenyl ether, propylene glycol phenyl ether, diethylene glycol monomethyl ether, diethylene glycol monoethyl ether, diethylene glycol monobutyl ether, triethylene glycol monomethyl ether, triethylene glycol monoethyl ether, dibutyl butyl ether, tetrahydrofuran, methyl cyclopentyl ether, or dioxane; N-methylpyrrolidone, 2-pyrrolidone, dimethylformamide, dimethylimidazolidinone, dimethyl sulfoxide, and dimethylacetamide. These organic solvents are suitably selected within the range that does not adversely affect the heat-resistant support or a substrate described below through erosion or the like, and preferred examples thereof include an ester-based organic solvent (preferably butyl acetate), an alcohol-based organic solvent (preferably methanol, ethanol, isopropanol, or isobutanol), an aliphatic ketone-based organic solvent (preferably methyl ethyl ketone, methyl isobutyl ketone, diacetone alcohol, cyclopentanone, or cyclohexanone), an ether-based organic solvent (ethylene glycol, diethylene glycol monomethyl ether, or methyl cyclopentyl ether), N-methylpyrrolidone, 2-pyrrolidone, dimethylformamide, dimethylimidazolidinone, dimethyl sulfoxide, and dimethylacetamide. More preferred examples thereof include an aliphatic ketone-based organic solvent, an alcohol-based organic solvent, an ether-based organic solvent, N-methylpyrrolidone, 2-pyrrolidone, dimethylformamide, dimethylimidazolidinone, dimethyl sulfoxide, and dimethylacetamide. These may be used alone or in combination or two or more kinds thereof.

It is preferable that a film which is formed on the heat-resistant support and formed to include a polyimide compound insolubilized through the heat treatment at 200° C. or higher and a polyimide precursor is prepared by coating the substrate with a solution (coating solution) containing the polyimide compound and the polyimide precursor, drying the heat-resistant support to form a film, bonding the heat-resistant support to the film, and peeling the substrate therefrom. A preferred form of the coating solution is as described above. When such a preparation method is employed, it is possible to differentiate the substrate used at the time of film formation from the heat-resistant support used at the time of heating at 200 ° H or higher. Accordingly, since the substrate at the time of film formation does not need to have heat resistance, a substrate suitable for a coating film can be employed. On the contrary, at the time of selecting a heat-resistant support, it is not necessary to consider coating and film-forming properties. In other words, there is an advantage that the selection range of the substrate or the heat-resistant support to be used is widened.

Moreover, for convenience of description in the present specification, the base material used for the heat treatment is expressed as a "heat-resistant support" and the base material simply used for film formation without being used for the heat treatment is expressed as a "substrate." However, the "heat-resistant support" and the "substrate" are not necessarily different from each other, and those formed of the same material can be used as the heat-resistant support and the substrate. For example, a glass plate suitable for the heat-resistant support can be suitably used as the substrate.

Since the substrate used for the preparation method does not need to have heat resistance, various known substrates of the related art can be employed as the substrate. Examples thereof include a polycarbonate (PC) resin substrate, a fluorine resin substrate, a polyethylene terephthalate (PET), a polybutylene terephthalate (PBT) substrate, a polyimide (PI) substrate, a polyamide (PA) substrate, a polysulfone (PSF) substrate, a polyether sulfone (PES) substrate, a polyphenyl sulfide (PPS) substrate, a polyether ether ketone (PEEK) substrate, a polyethylene naphthalate (PEN) substrate, a cycloolefin polymer (COP) substrate, a glass substrate, and an acrylic substrate.

The thickness of the substrate is not particularly limited, but is preferably in a range of 50 µm to 5000 µm and more preferably in a range of 100 µm to 2000 µm from the viewpoint of suppressing generation of a defect caused by bending or cracking of the substrate.

The method of bonding the heat-resistant support to the film formed on the substrate is not particularly limited, but it is preferable that the heat-resistant support is bonded thereto by providing double-sided tape or an adhesive on the outer peripheral portion of the film. Adhesives described in the section of the adhesive layer described above can be used as the adhesive. Further, when double-sided tape or an adhesive is provided on the peripheral portion of the film, substantial influence on the gas separation performance and the like of a film to be obtained can be avoided even if the double-sided tape or the adhesive is melted or decomposed by the heat treatment which is a process performed after the double-sided tape or the adhesive is provided. The area of the outer peripheral portion of the film on which the double-sided tape or the adhesive is provided to the area of the entire film [area of outer peripheral portion]/[area of entire bonding surface] is preferably in a range of 1/100 to 30/100 and more preferably in a range of 2/100 to 20/100. Further, it is preferable that the width of the outer peripheral portion of the bonding surface is uniform, but the width thereof may be non-uniform.

Moreover, a method of peeling off the substrate after the heat-resistant support is bonded to the film formed on the substrate is not particularly limited, but it is preferable that the substrate is peeled off in water from the viewpoint that a gap is unlikely to be generated between the heat-resistant support and the film. The temperature of water at this time is preferably in a range of 10° C. to 40° C. It is preferable that the water used at the time of the peeling is pure water. In a case where the substrate is peeled off in water, a laminate formed of the remaining heat-resistant support and the film (a portion between both films has an adhesive layer formed of double-sided tape or an adhesive as needed) formed to include a polyimide compound or a polyimide precursor is taken out from water to be dried and subjected to a heat treatment at 200° C. or higher.

The thickness of the film formed on the heat-resistant support before the heat treatment is carried out is preferably in a range of 0.1 µm to 5.0 µm and more preferably in a range of 0.1 µm to 2.0 µm.

In the process (a), when the film which is formed on the heat-resistant support and formed to include a polyimide compound insolubilized by the heat treatment at 200° C. or higher or a polyimide precursor is subjected to the heat treatment at 200° C. or higher, the polyimide compound constituting the film is insolubilized to obtain an insoluble polyimide compound or the polyimide precursor constituting the film is ring-closed to obtain an insoluble polyimide compound. The polyimide compound constituting the film employs a cross-linked structure so as to be insolubilized by the heat treatment, and the gas separation performance is further improved and resistance to impurity components contained in gas such as toluene is also improved.

Here, the "insoluble polyimide compound" has the same definition as that described above. That is, the insoluble polyimide compound indicates a polyimide compound having a solubility of 20 mg/100 g or less in diacetylamide at 20° C. The solubility of the insoluble polyimide compound, which is generated by the heat treatment at 200° C. or higher during the process (a), in diacetylamide at 20° C. is preferably 15 mg/100 g or less and more preferably 10 mg/100 g or less. Further, the solubility of the insoluble polyimide compound, which is generated by the heat treatment at 200° C. or higher during the process (a), in diacetylamide at 20° C. may be 0 mg/100 g and typically 0.1 mg/100 g or greater.

The temperature of the heat treatment at 200° C. or greater during the process (a) is appropriately adjusted according to the heat resistance of the heat-resistant support to be used, but is preferably in a range of 200° C. to 400° C., more preferably in a range of 200° C. to 350° C., and still more preferably 220° C. to 300° C., from the viewpoints of the degree of crosslinking and the temperature of thermocompression of polyimide.

In addition, for the purpose of sufficiently insolubilizing the polyimide compound, the time for the heat treatment is preferably 0.2 time or longer and more preferably 0.5 time or longer. From the viewpoint of production efficiency, the time for the heat treatment is preferably within 10 hours, more preferably within 5 hours, and still more preferably within 2 hours. The film thickness of the film formed to include an insoluble polyimide after the heat treatment is carried out is preferably in a range of 0.1 µm to 5.0 µm and more preferably 0.1 µm to 2.0 µm.

In the process (a), the air at the time of forming a film and the gas such as oxygen may by allowed to coexist, but it is desired that the film is formed in an inert gas atmosphere.

—Process (b)—

In the process (b), the gas permeating support is bonded to the film formed to include an insoluble polyimide compound that is obtained during the process (a) and formed on the heat-resistant support. The details of the gas permeating support are as described above. The bonding method is not particularly limited, but it is preferable that the gas heat-resistant support is bonded by providing double-sided tape or an adhesive on the outer peripheral portion of the film. Adhesives described in the section of the adhesive layer described above can be used as the adhesive.

The area of the outer peripheral portion of the film on which the double-sided tape or the adhesive is provided to the area of the entire film [area of outer peripheral portion]/[area of entire bonding surface] is preferably in a range of 1/100 to 30/100 and more preferably in a range of 2/100 to 20/100. Further, it is preferable that the width of the outer peripheral portion of the bonding surface is uniform.

Figure 2:
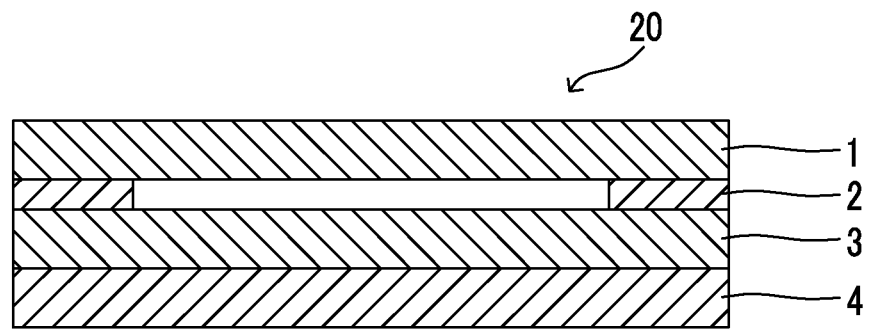
FIG. 2 is a sectional view schematically illustrating an example of a laminate prepared by a process of producing the gas separation composite membrane of the present invention.

FIG. 2 illustrates a sectional structure of a laminate formed by bonding the gas permeating support to the film during the process (b). The laminate prepared by the process (b) has a structure in which a gas permeating support (1), an adhesive layer (2, hereinafter, also referred to as an "adhesive layer I") to be provided as needed, a gas separation layer (3), and a heat-resistant support (4) are laminated in this order. An adhesive layer (hereinafter, also referred to as an "adhesive II") may be further provided between the gas separation layer (3) and the heat-resistant support (4).

—Process (c)—

In the process (c), the heat-resistant support is peeled off from the laminate that is obtained by the process (b) and formed of the heat-resistant support, (the adhesive layer II), the gas separation layer, (the adhesive layer I), and the gas permeating support. Further, the parentheses of "(the adhesive layer I)" and "(the adhesive layer II)" mean that the respective adhesive layers are not indispensable configurations, but the form with the adhesive layer (I) present therebetween is preferable.

The method of peeling off the heat-resistant support is not particularly limited, but it is preferable that the heat-resistant support is peeled off in water from the viewpoint that a gap is unlikely to be generated between the gas separation layer and the gas permeating support. The temperature of water at this time is preferably in a range of 10° C. to 40° C. It is preferable that the water used at the time of the peeling is pure water. Moreover, in a case where the adhesive layer (II) is present, the adhesive layer (II) may be peeled off at the same time when the heat-resistant support is peeled off from the laminate or the adhesive layer (II) may be peeled off after the heat-resistant support is peeled off from the laminate. In addition, the adhesive layer (II) is not necessarily peeled off from the laminate and the adhesive layer (II) may be present on the gas separation layer.

In a case where the heat-resistant support is peeled off in water, the composite membrane of the present invention can be obtained by taking the laminate, formed of the gas separation layer, (the adhesive layer I), and the gas permeating support, out of water and drying the laminate if necessary.

Next, the polyimide compound that constitutes the film formed on the heat-resistant support and is insolubilized by the heat treatment at 200° C. or greater in the above-described process (a) or the polyimide precursor will be described in more detail.

(Polyimide Compound)

The polyimide compound used to produce the composite membrane of the present invention and insolubilized by the heat treatment at 200° C. or higher is not particularly limited as long as the compound is solubilized by the heat treatment at 200° C. or higher. It is assumed that the insolubilization is caused by a cross-linked structure being formed between molecules or in a molecular due to a decarboxylation reaction resulting from the heat treatment. It is preferable that the polyimide compound insolubilized by the heat treatment at 200° C. or higher is capable of forming a film by being applied. More specifically, the solubility of the polyimide compound, insolubilized by the heat treatment at 200° C. or higher, in dimethylacetamide at 20° C. is preferably 500 mg/100 g or greater and more preferably in a range of 1000 mg/100 g to 50000 mg/100 g.

It is preferable that the polyimide compound insolubilized by the heat treatment at 200° C. or higher includes a repeating unit represented by the following Formula (I). The polyimide compound may include two or more kinds of repeating units represented by the following Formula (I).

Formula (I)

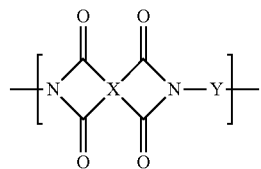

In Formula (I), X represents a group having a structure represented by any of the following Formulae (I-1) to (I-28). In the following Formulae (I-1) to (I-28), the symbol "*" represents a binding site with respect to a carbonyl group of Formula (I). X in Formula (I) is referred to as a mother nucleus in some cases, and this mother nucleus X is preferably a group represented by Formulae (I-1), (I-2), or (I-4), more preferably a group represented by Formula (I-1) or (I-4), and particularly preferably a group represented by Formula (I-1).

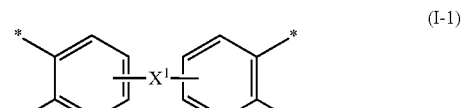
(I-1)

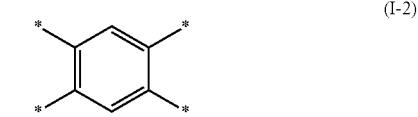
(I-2)

(I-3)

(I-4)

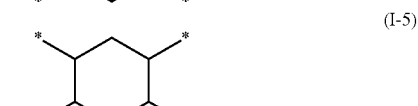
(I-5)

(I-6)

(I-7)

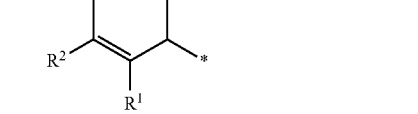
(I-8)

(I-9)

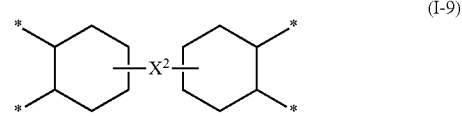
(I-10)

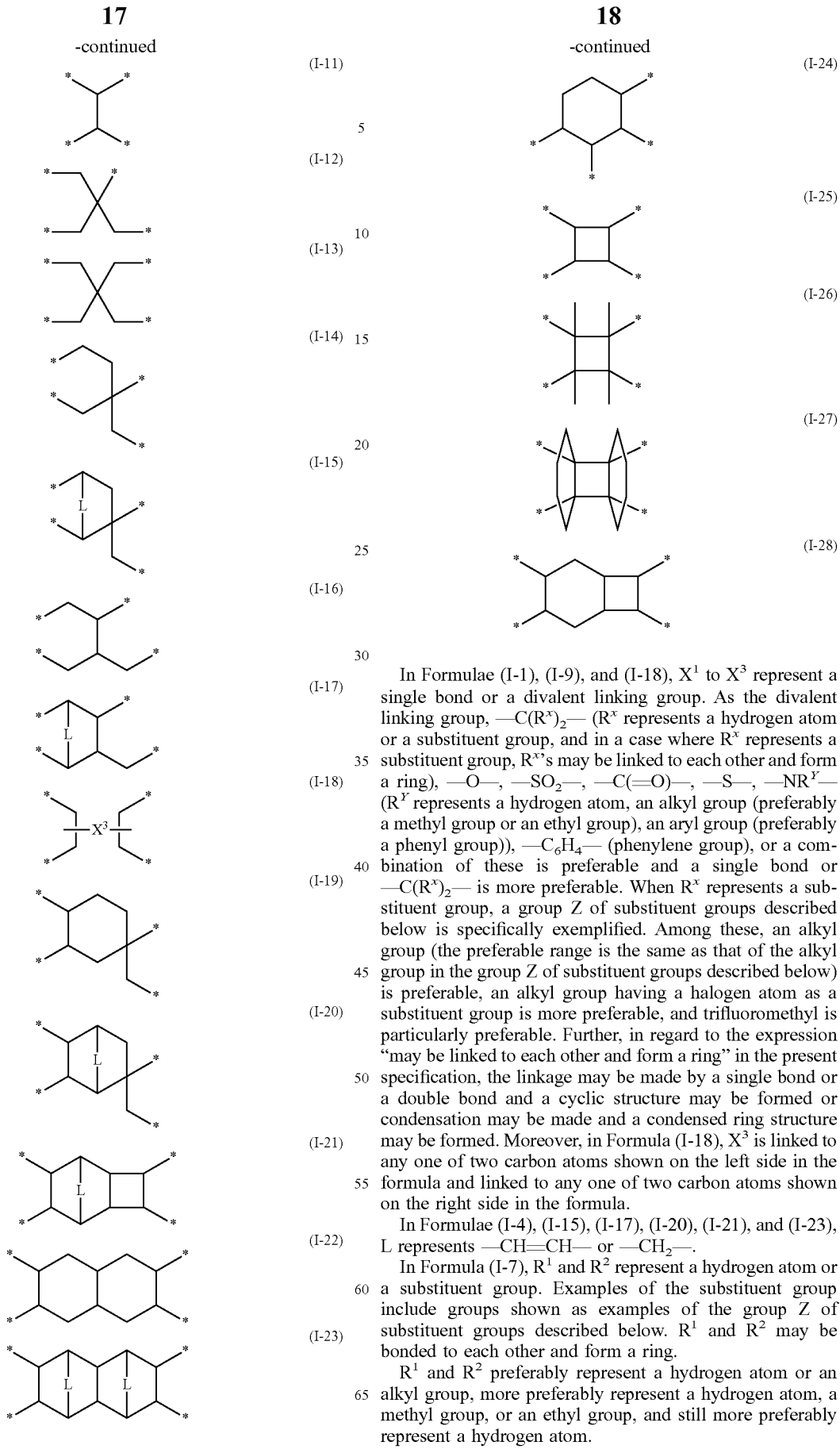

In Formulae (I-1), (I-9), and (I-18), $X^1$ to $X^3$ represent a single bond or a divalent linking group. As the divalent linking group, —C($R^x$)$_2$— ($R^x$ represents a hydrogen atom or a substituent group, and in a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), an aryl group (preferably a phenyl group)), —C$_6$H$_4$— (phenylene group), or a combination of these is preferable and a single bond or —C($R^x$)$_2$— is more preferable. When $R^x$ represents a substituent group, a group Z of substituent groups described below is specifically exemplified. Among these, an alkyl group (the preferable range is the same as that of the alkyl group in the group Z of substituent groups described below) is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and a cyclic structure may be formed or condensation may be made and a condensed ring structure may be formed. Moreover, in Formula (I-18), $X^3$ is linked to any one of two carbon atoms shown on the left side in the formula and linked to any one of two carbon atoms shown on the right side in the formula.

In Formulae (I-4), (I-15), (I-17), (I-20), (I-21), and (I-23), L represents —CH=CH— or —CH$_2$—.

In Formula (I-7), $R^1$ and $R^2$ represent a hydrogen atom or a substituent group. Examples of the substituent group include groups shown as examples of the group Z of substituent groups described below. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

The carbon atoms shown in Formulae (I-1) to (I-28) may further have substituent groups. Specific examples of the substituent groups are the same as the group Z of substituent groups described below. Among these, an alkyl group or an aryl group is preferable.

In Formula (I), Y represents an arylene group. Y represents preferably an arylene group having 6 to 20 carbon atoms, more preferably an arylene group having 6 to 15 carbon atoms, and still more preferably a phenylene group. It is preferable that the arylene group as Y has a substituent group, and examples of the substituent group include the group Z of substituent groups described below. It is preferable that the polyimide compound includes both of a repeating unit of Formula (I) in which Y has a polar group and a repeating unit of Formula (I) in which Y does not have a polar group. Examples of the polar group which can be included in Y include a carboxy group, an amino group, a hydroxyl group, a sulfone group, a halogen atom, or an alkoxy group. When the polyimide compound includes a repeating unit of Formula (I) in which Y has a polar group, the polymer is suitably densed and the gas separation selectivity of a film when used for the gas separation membrane can be further improved.

The ratio of the repeating unit represented by Formula (I) to the entire repeating units of the polyimide compound insolubilized by the heat treatment at 200° C. or higher is not particularly limited and appropriately adjusted in consideration of gas permeability and gas separation selectivity according to the purpose of gas separation (recovery rate, purity, or the like).

The polyimide compound used in the present invention and insolubilized by the heat treatment at 200° C. or higher is synthesized using a tetracarboxylic dianhydride and a diamine (the term "diamine" or "diamine compound" in the present specification indicates a compound having two or more amino groups and preferably a compound having two amino groups) as raw materials. When described using an example of the repeating unit of Formula (I), Y is a diamine component and the structure of a portion from which Y is removed is a tetracarboxylic dianhydride component. That is, Formula (I) shows a repeating unit formed of one tetracarboxylic dianhydride component and one diamine component. The amount of the repeating unit of Formula (I) is preferably 10% by mole or greater, more preferably 30% by mole or greater, and still more preferably 50% by mole or greater with respect to the total amount (100% by mole) of repeating units, each of which is formed of one tetracarboxylic dianhydride component and one diamine component. Further, the amount thereof may be 70% by mole or greater, 80% by mole or greater, and preferably 100% by mole.

Unless the amount of the repeating unit of Formula (I) with respect to the total amount of the repeating units is 100% by mole, the structure of the repeating unit of the remainder is not particularly limited. Examples of the structure include a structure in which Y of Formula (I) is replaced by a structure derived from substituted or unsubstituted bis(4-aminophenyl) ether; a structure in which Y of Formula (I) is replaced by a structure derived from substituted or unsubstituted methylene dianiline; a structure in which Y of Formula (I) is replaced by a structure derived from substituted or unsubstituted 4,4'-diaminodiphenylsulfone; and a structure in which Y of Formula (I) is replaced by a structure derived from substituted or unsubstituted ditolylamine, but the present invention is not limited thereto.

The weight average molecular weight of the polyimide compound used in the present invention is preferably in a range of 10,000 to 1,000,000, more preferably in a range of 15,000 to 500,000, and still more preferably in a range of 20,000 to 200,000.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filling a column used for the GPC method and examples of the gel include a gel formed of a styrene-divinylbenzene copolymer. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

—Synthesis of Polyimide Compound—

The polyimide compound which can be used in the present invention and is insolubilized by the heat treatment at 200° C. or higher can be synthesized by performing condensation and polymerization of a specific bifunctional acid dianhydride (tetracarboxylic dianhydride) and a specific diamine. As the method, a technique described in a general book (for example, "The Latest Polyimide ~Fundamentals and Applications~" edited by Toshio Imai and Rikio Yokota, NTS Inc., Aug. 25, 2010, pp. 3 to 49) can be appropriately selected.

In the synthesis of the polyimide compound which can be used in the present invention and is insolubilized by the heat treatment at 200° or higher, at least one tetracarboxylic dianhydride used as a raw material is represented by the following Formula (IV). It is preferable that all tetracarboxylic dianhydrides used as a raw material are represented by the following Formula (IV).

Formula (IV)

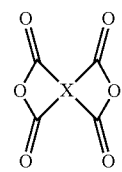

In Formula (IV), X has the same definition as that for X in Formula (I).

Specific examples of the tetracarboxylic dianhydride which can be used in the present invention are as follows, but the present invention is not limited thereto.

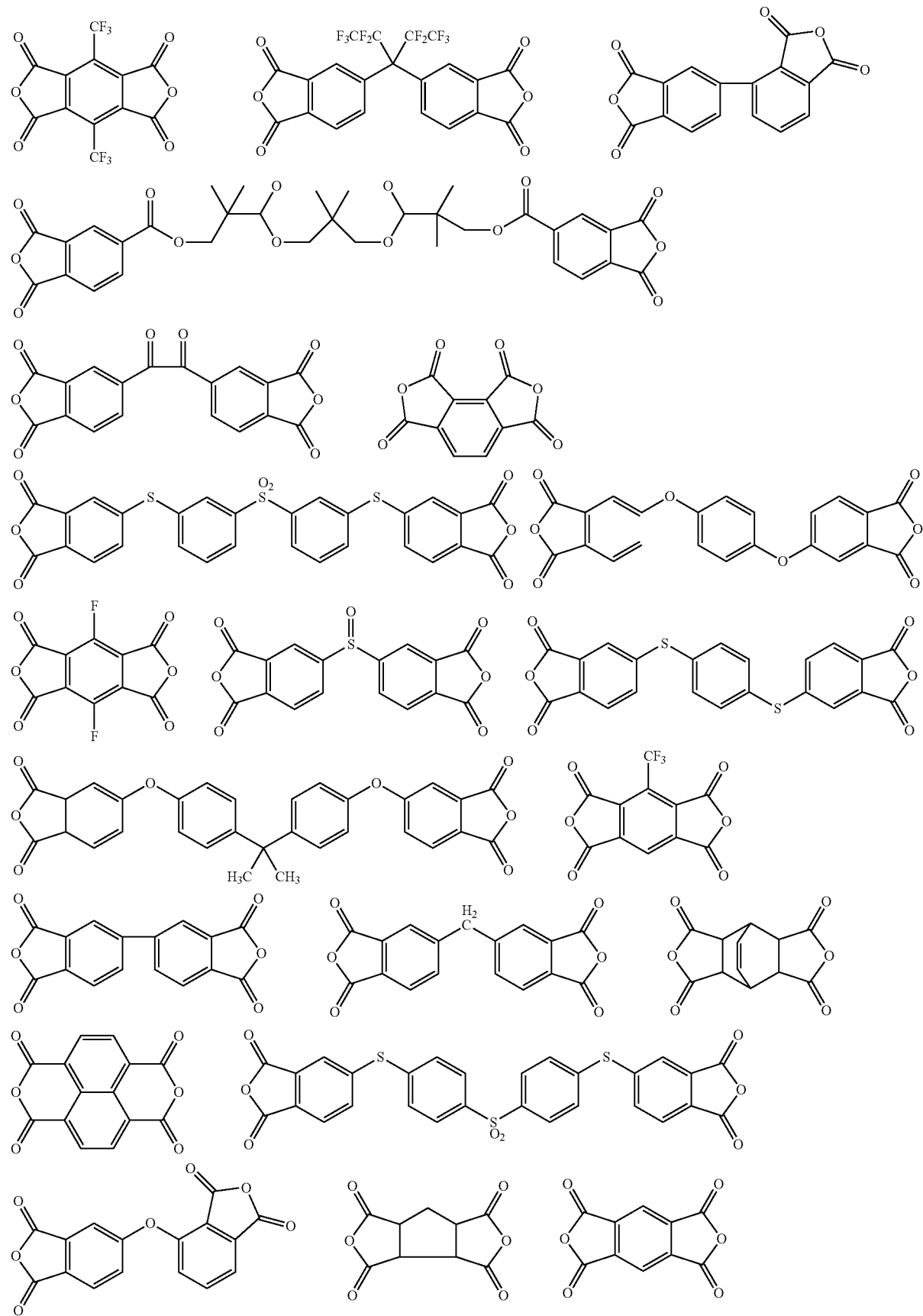

-continued
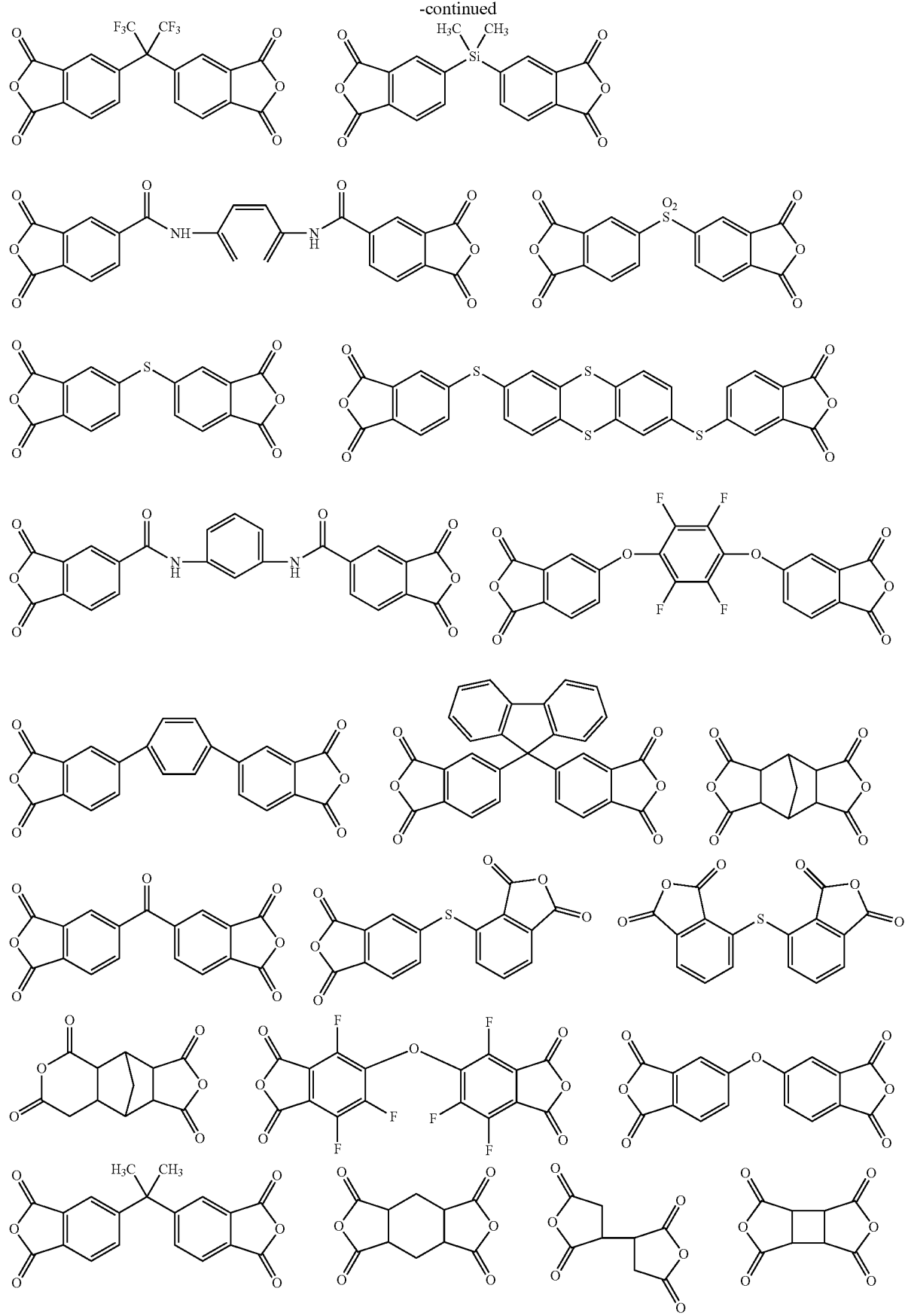

-continued
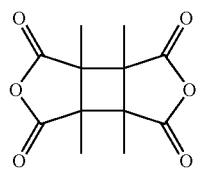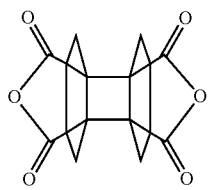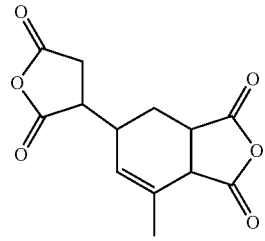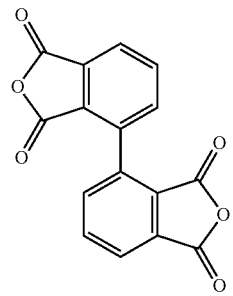
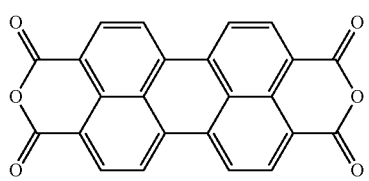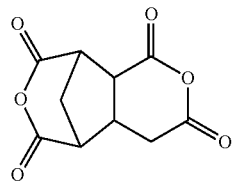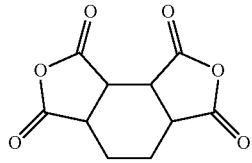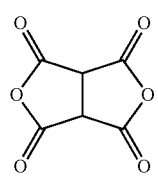
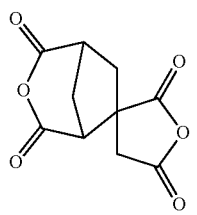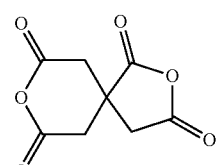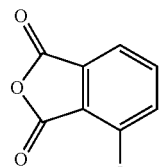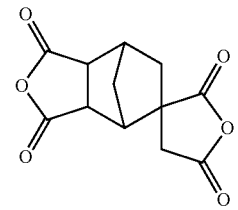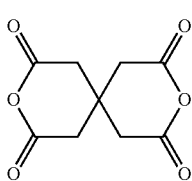
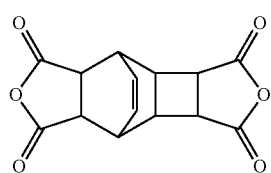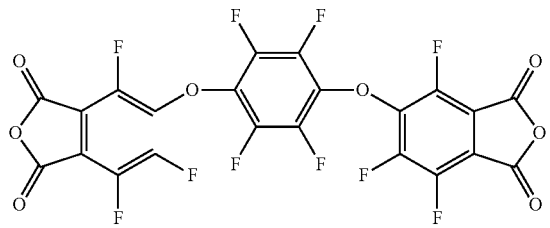
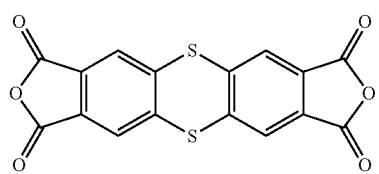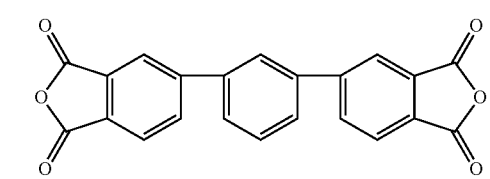
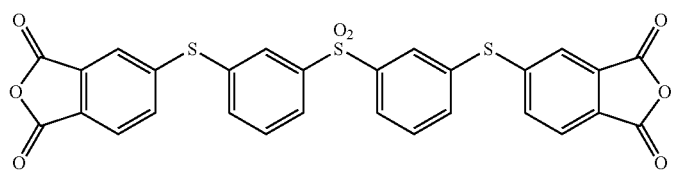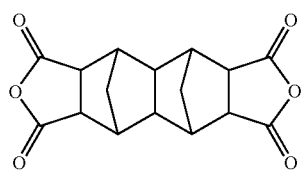
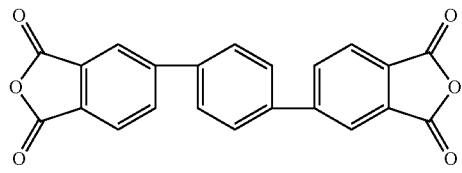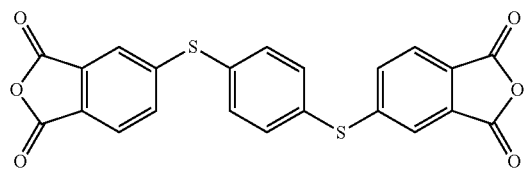

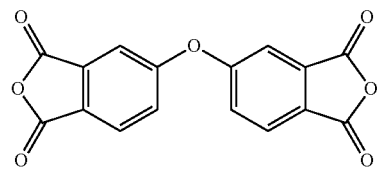
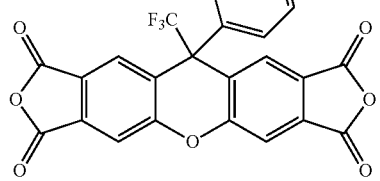

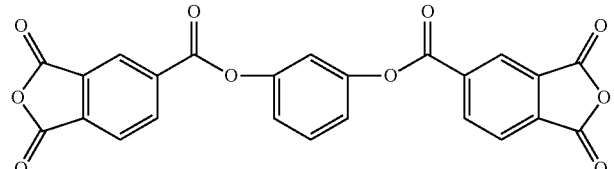
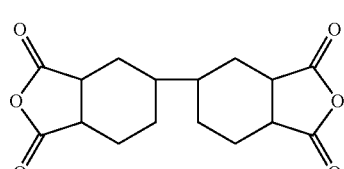

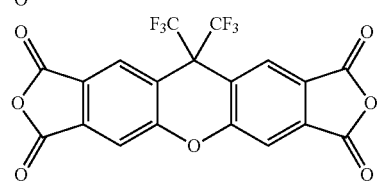
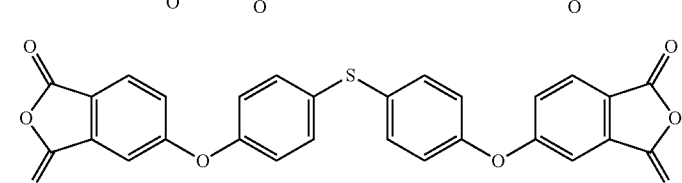

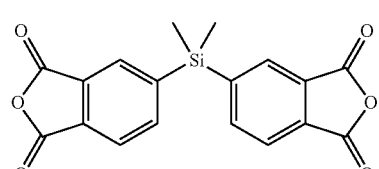
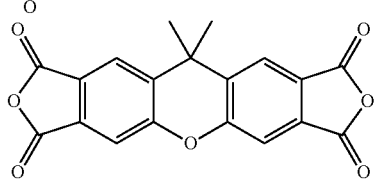

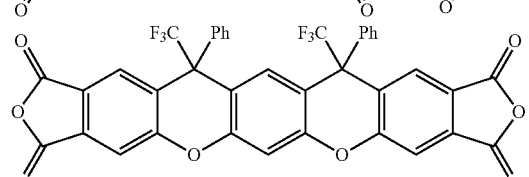
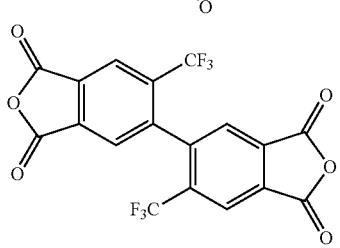

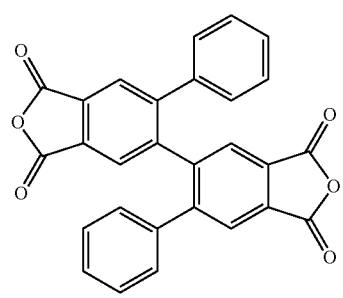

In the synthesis of the polyimide compound which can be used in the present invention and is insolubilized by the heat treatment at 200° C. or higher, at least one diamine compound used as a raw material is aromatic hydrocarbon having at least two amino groups. The number of carbon atoms of the aromatic hydrocarbon having at least two amino groups is preferably in a range of 6 to 20 and more preferably in a range of 6 to 15. As the aromatic hydrocarbon, phenylene diamine is still more preferable. The aromatic hydrocarbon having at least two amino groups may have a substituent group other than an amino group, and examples of the substituent group include the group Z of substituent groups described below. As the above-described aromatic hydrocarbon having at least two amino groups, aromatic hydrocarbon having two amino groups is preferable.

Specific examples of the above-described aromatic hydrocarbon having at least two amino groups include the followings, but the present invention is not limited thereto.

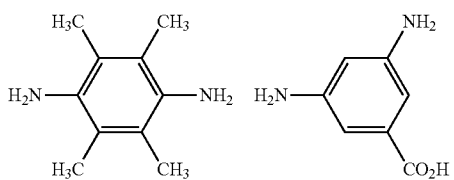

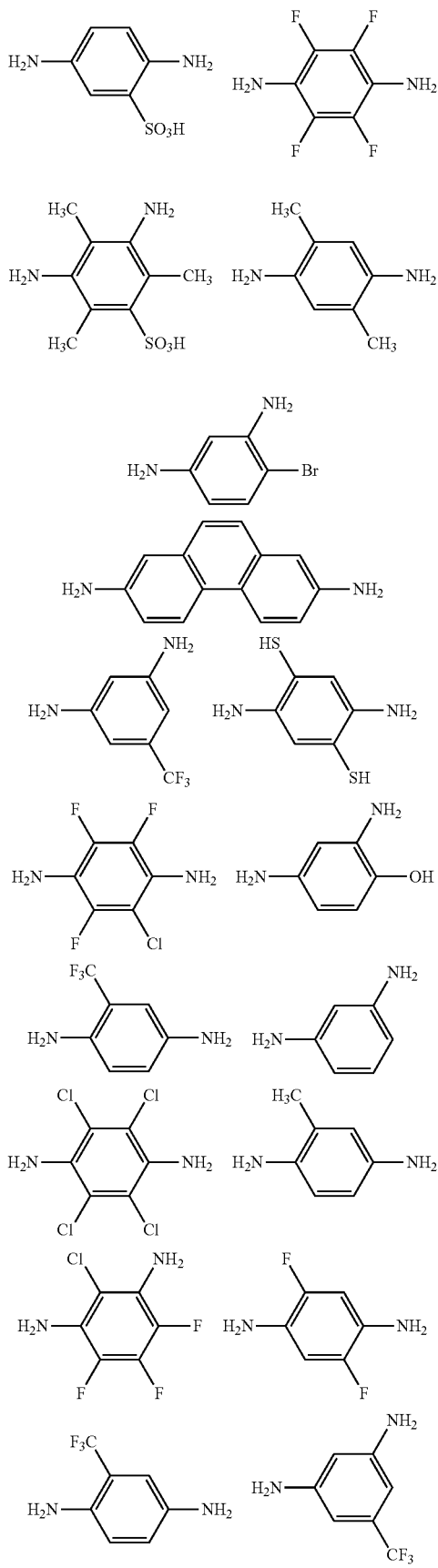

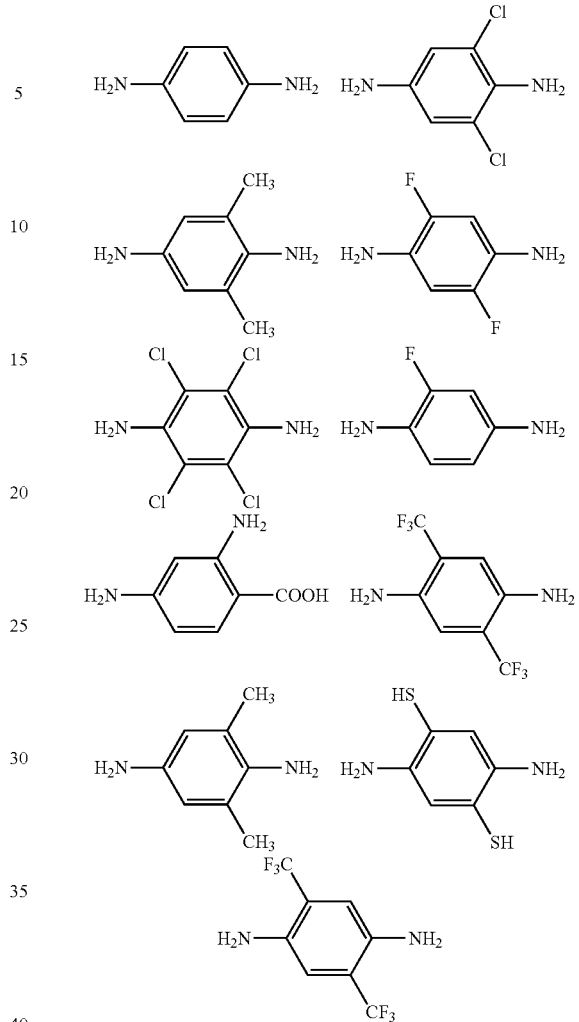

The polyimide compound used in the present invention and insolubilized by the heat treatment at 200° C. or higher can be obtained by mixing the above-described respective raw materials in a solvent and performing condensation and polymerization using a typical method.

The solvent is not particularly limited. Examples thereof include an ester-based organic solvent such as methyl acetate, ethyl acetate, or butyl acetate; an aliphatic ketone organic solvent such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride serving as a reaction substrate, a diamine compound, polyamic acid which is a reaction intermediate, and a polyimide compound which is a final product can be dissolved. Among these, an ester-based organic solvent (preferably butyl acetate), an aliphatic ketone organic solvent (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent (preferably N-methylpyrrolidone), or a sulfur-containing organic solvent (dimethyl sulfoxide or sulfolane) is preferable. In addition, these can be used alone or in combination of two or more kinds thereof.

A temperature which can be usually employed for the synthesis of the polyimide compound can be employed without being particularly limited to the polymerization reaction temperature. Specifically, the temperature is preferably in a range of −40° C. to 60° C. and more preferably in a range of −30° C. to 50° C.

The polyimide compound can be obtained by imidizing the polyamic acid, which is generated by the above-described polymerization reaction, through a dehydration ring-closure reaction in a molecule. As a method of the dehydration ring-closure reaction, a method described in a general book (for example, "The Latest Polyimide ~Fundamentals and Applications~" edited by Toshio Imai and Rikio Yokota, NTS Inc., Aug. 25, 2010, pp. 3 to 49) can be used as reference. A thermal imidization method of performing heating in a temperature range 120° C. to 200° C. and removing water generated as a by-product to the outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or DBU is preferably used.

In the present invention, the total concentration of the tetracarboxylic dianhydride and the diamine compound in the polymerization reaction solution of the polyimide compound is not particularly limited, but is preferably in a range of 5% by mass to 70% by mass, more preferably in a range of 5% by mass to 50% by mass, and still more preferably in a range of 5% by mass to 30% by mass.

(Polyimide Precursor)

The polyimide precursor used to produce the composite membrane of the present invention is polyamic acid or a derivative thereof and is not particularly limited as long as the precursor is ring-closed by the heat treatment at 200° C. or higher and generates insoluble polyimide. A polyimide precursor which is capable of forming a film by being applied is preferable. More specifically, the solubility of the polyimide precursor in dimethylacetamide at 20° C. is preferably 500 mg/100 g or greater and more preferably in a range of 1000 mg/100 g to 50000 mg/100 g.

It is preferable that the polyimide precursor includes a repeating unit represented by the following Formula (II). The polyimide compound may include two or more repeating units represented by the following Formula (II).

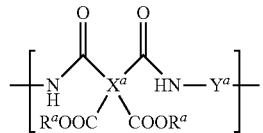

Formula (II)

In Formula (II), $X^a$ represents a tetravalent aliphatic group, a tetravalent aromatic group, or a tetravalent group formed by combining one or two or more kinds selected from an aliphatic group and an aromatic group. Here, the "tetravalent group formed by combining one or two or more kinds selected from an aliphatic group and an aromatic group" includes a tetravalent group formed by a plurality (two or three or more) of aromatic groups being connected to each other with a single bond. Moreover, the aliphatic group may be linear, branched, or cyclic.

In a case where $X^a$ represents a tetravalent aliphatic group, the number of carbon atoms thereof is preferably in a range of 3 to 20, more preferably in a range of 4 to 18, and still more preferably in a range of 6 to 15.

In a case where $X^a$ represents a tetravalent aromatic group, the number of carbon atoms thereof is preferably in a range of 4 to 20, more preferably in a range of 4 to 18, and still more preferably in a range of 5 to 15.

In a case where $X^a$ represents a tetravalent group formed by combining one or two or more kinds selected from an aliphatic group and an aromatic group, the number of carbon atoms thereof is preferably in a range of 4 to 20 and more preferably in a range of 5 to 15. Further, as the tetravalent group formed by combining one or two or more kinds selected from an aliphatic group and an aromatic group, a tetravalent group having a structure in which two aromatic rings are connected to each other with a single bond or an aliphatic group is preferable.

It is preferable that $X^a$ represents a group having a structure represented by any of the following Formulae (I-1) to (I-28).

In Formula (II), $R^a$ represents a hydrogen atom, an alkyl group having 1 to 6 carbon atoms (preferably an alkyl group having 1 to 4 carbon atoms and more preferably a methyl group, an ethyl group, or a propyl group), or an alkylsilyl group having 3 to 9 carbon atoms (preferably an alkylsilyl group having 3 to 6 carbon atoms). It is more preferable that both of two $R^a$'s represent a hydrogen atom. In a case where $R^a$ represents an alkylsilyl group, a trialkylsilyl group is preferable.

In Formula (II), $Y^a$ represents a divalent aliphatic group, a divalent aromatic group, or a divalent group formed by combining one or two or more kinds selected from an aliphatic group and an aromatic group. Here, the "divalent group formed by combining one or two or more kinds selected from an aliphatic group and an aromatic group" includes a divalent group formed by a plurality (two or three or more) of aromatic groups being connected to each other with a single bond. Moreover, the aliphatic group may be linear, branched, or cyclic.

In a case where $Y^a$ represents a divalent aliphatic group, the number of carbon atoms thereof is preferably in a range of 1 to 30 and more preferably in a range of 2 to 20.

In a case where $Y^a$ represents a divalent aromatic group, the number of carbon atoms thereof is preferably in a range of 4 to 20, more preferably in a range of 4 to 15, and still more preferably in a range of 5 to 15. In a case where $Y^a$ represents a divalent aromatic group, $Y^a$ represents preferably an arylene group, more preferably an arylene group having 6 to 20 carbon atoms, still more preferably an arylene group having 6 to 15 carbon atoms, and even still more preferably a phenylene group.

In a case where $Y^a$ represents a divalent group formed by combining one or two or more kinds selected from an aliphatic group and an aromatic group, the number of carbon atoms thereof is preferably in a range of 5 to 30 and more preferably in a range of 6 to 20. Further, as the divalent group formed by combining one or two or more kinds selected from an aliphatic group and an aromatic group, a divalent group having a structure in which two aromatic rings are connected to each other with a single bond or an aliphatic group is preferable. In this case, the number of carbon atoms of the structure in which two aromatic rings are connected to each other with a single bond or an aliphatic group is preferably in a range of 10 to 30, more preferably in a range of 10 to 20, still more preferably in a range of 12 to 20, and even still more preferably in a range of 12 to 18. In the case where $Y^a$ represents a divalent group formed by combining one or two or more kinds selected from an aliphatic group and an aromatic group, the aromatic group is preferably an arylene group, more preferably an arylene group having 6 to 20 carbon atoms, still more preferably an arylene group having 6 to 15 carbon atoms, and even still more preferably a phenylene group.

The polyimide precursor used in the present invention is synthesized using a tetracarboxylic dianhydride and a diamine as raw materials in the same manner as that of the polyimide compound. When described using an example of the repeating unit of Formula (II), $Y^a$ is a diamine component and the structure of a portion from which $Y^a$ is removed is a tetracarboxylic dianhydride component. The amount of the repeating unit of Formula (II) is preferably 10% by mole or greater, more preferably 30% by mole or greater, and still more preferably 50% by mole or greater with respect to the total amount (100% by mole) of repeating units, each of which is formed of one tetracarboxylic dianhydride component and one diamine component. Further, the amount thereof may be 70% by mole or greater, 80% by mole or greater, and preferably 100% by mole.

The weight average molecular weight of the polyimide precursor used in the present invention is preferably in a range of 10,000 to 1,000,000, more preferably in a range of 15,000 to 500,000, and still more preferably in a range of 20,000 to 200,000.

The polyimide precursor is commercially available. Examples of the commercially available products which can be used as the polyimide precursor in the present invention include U-IMIDE VARNISH (trade name, manufactured by Unitika Ltd.), U-VARNISH (trade name, manufactured by Ube Industries, Ltd.), and PYRE-ML (trade name, manufactured by Industrial Summit Technology Corp.).

—Synthesis of Polyimide Precursor—

The method of synthesizing the polyimide precursor is not particularly limited. For example, the polyimide precursor can be obtained by dissolving a diamine having a desired structure in N-methyl-pyrrolidone or N,N-dimethylacetamide in a nitrogen atmosphere, adding a tetracarboxylic dianhydride having a desired structure to the solution while the solution is stirred, and stirring the solution at a temperature of 80° C. for approximately 2 hours using a warm water bath or the like.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazine group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

When a compound or a substituent group includes an alkyl group or an alkenyl group, these may be linear or branched and may be substituted or non-substituted. In addition, when a compound or a substituent group includes an aryl group or a heterocyclic group, these may be a single ring or condensed and may be substituted or non-substituted.

In the present specification, when a group is described as only a substituent group, the group Z of substituent groups can be used as reference unless otherwise specified. Further, when only the names of the respective groups are described (for example, a group is described as an "alkyl group"), the preferable range and the specific examples of the corresponding group in the group Z of substituent groups are applied.

(Other Components)

Since membrane physical properties are adjusted, various polymer compounds can be added to the gas separation layer of the composite membrane of the present invention. Examples of the polymer compound which can be used include an acrylic polymer, a polyurethane resin, a polyamide resin, a polyester resin, an epoxy resin, a phenol resin, a polycarbonate resin, a polyvinyl butyral resin, a polyvinyl formal resin, shellac, a vinyl-based resin, an acrylic resin, a rubber-based resin, waxes, and other natural resins. Further, these may be used in combination of two or more kinds thereof.

Moreover, a non-ionic surfactant, a cationic surfactant, or an organic fluoro compound can be added in order to adjust liquid properties.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from known surfactants of the related art and derivatives thereof.

Further, a polymer dispersing agent may be included, and specific examples of the polymer dispersing agent include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

<Use and Characteristics of Gas Separation Composite Membrane>

The composite membrane of the present invention can be suitably used according to a gas separation recovery method and a gas separation purification method. For example, a gas separation membrane which is capable of efficiently separating specific gas from a gas mixture containing gas, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane can be obtained. Particularly, it is preferable that a gas separation membrane selectively separating carbon dioxide from a gas mixture containing carbon dioxide and hydrocarbon (methane) is obtained.

In a case where gas subjected to a separation treatment is mixed gas of carbon dioxide and methane, the permeation rate of the carbon dioxide at 40° C. and 5 MPa is preferably greater than 5 GPU and more preferably greater than 10 GPU. Further, the upper limit of the permeation rate of the carbon dioxide is not particularly limited, but is typically 500 GPU or less and may be 400 GPU or less or 200 GPU or less.

The ratio between permeation rates of carbon dioxide and methane ($R_{CO2}/R_{CH4}$) is preferably 15 or greater, more preferably 20 or greater, still more preferably 25 or greater, even still more preferably 30 or greater, and even still more preferably 40 or greater. The upper limit of the ratio between the permeation rates is not particularly limited, but is typically 100 or less. $R_{CO2}$ represents the permeation rate of carbon dioxide and $R_{CH4}$ represents the permeation rate of methane.

Further, 1 GPU is $1 \times 10^{-6}$ cm$^3$ (STP)/cm$^2$·sec·cmHg.

[Method of Separating Gas Mixture]

The gas separation method of the present invention is a method that includes a process of selectively permeating carbon dioxide from mixed gas containing carbon dioxide and methane using the composite membrane of the present invention. The pressure at the time of gas separation is preferably in a range of 0.5 MPa to 10 MPa, more preferably in a range of 1 MPa to 10 MPa, and still more preferably in a range of 2 MPa to 7 MPa. Further, the gas separation temperature is preferably in a range of −30° C. to 90° C. and more preferably in a range of 15° C. to 70° C. In the mixed gas containing carbon dioxide and methane gas, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 90:10.

[Gas Separation Module and Gas Separation Device]

The composite membrane of the present invention is a composite membrane combining a gas permeating support with a gas separation layer and a gas separation module can be prepared using the gas separation membrane. Examples of the module include a spiral type module, a hollow fiber type module, a pleated module, a tubular module, and a plate & frame type module.

Moreover, when the composite membrane or the gas separation module of the present invention is used, it is possible to obtain a gas separation device having means for performing separation and recovery of gas or performing separation and purification of gas. The composite membrane of the present invention may be applied to a gas separation and recovery apparatus which is used together with an absorption liquid described in JP2007-297605A according to a membrane/absorption hybrid method.

EXAMPLES

The present invention will be described in detail with reference to examples, but the present invention is not limited these examples.

Synthesis Example

Synthesis Example 1

Synthesis of Polyimide (P-01)

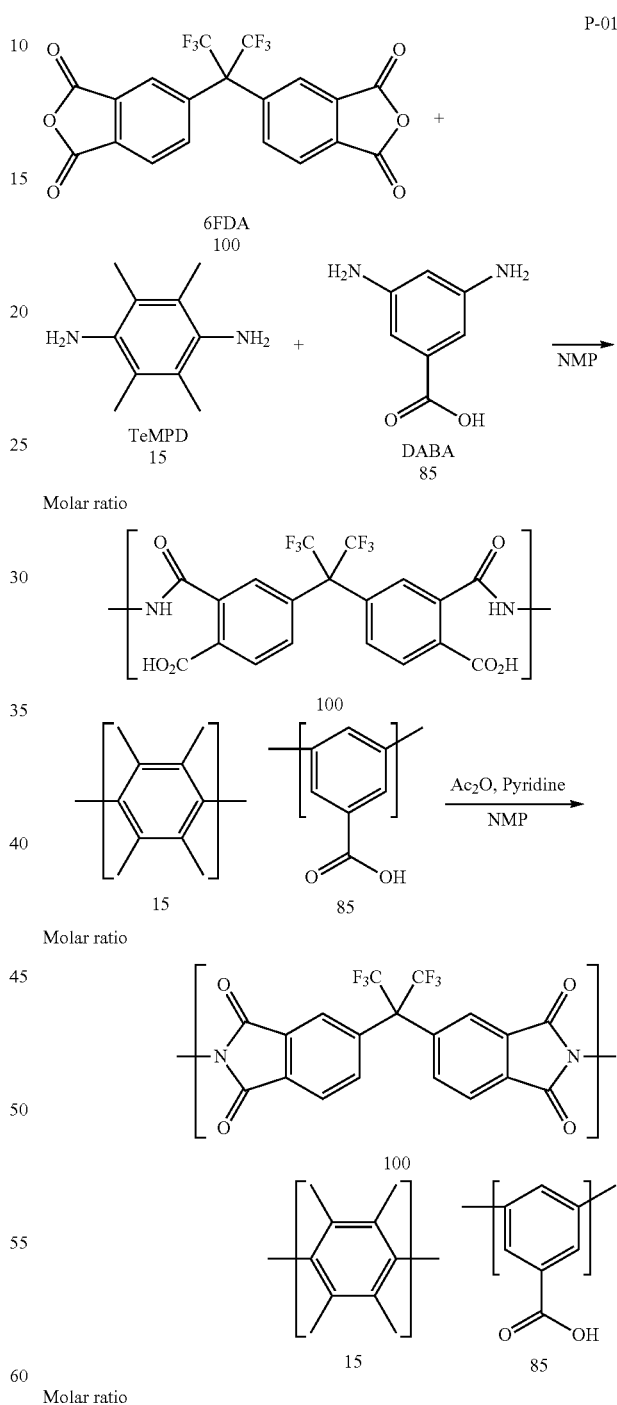

123 mL of N-methylpyrrolidone (manufactured by Tokyo Chemical Industry Co., Ltd., product number: M0418) and 54.97 g (0.124 mol) of 6FDA (manufactured by Tokyo Chemical Industry Co., Ltd., product number: H1438) were added to a 1 L three-necked flask, dissolved therein at 40° C., and stirred in a nitrogen stream. A solution obtained by dissolving 3.056 g (0.0186 mol) of 2,3,5,6-tetramethylphenylenediamine (manufactured by Tokyo Chemical Industry Co., Ltd., product number: T1457) and 16.04 g (0.1055 mol) of 3,5-diaminobenzoic acid (DABA) (manufactured by Tokyo Chemical Industry Co., Ltd., product number: D0294) in 84.0 mL of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Tokyo Chemical Industry Co., Ltd., product number: Q0034) and 31.58 g (0.31 mol) of acetic anhydride (manufactured by Wako Pure Chemical Industries, Ltd., product number: 018-00286) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then air-dried at 60° C., thereby obtaining 51.3 g of polyimide (P-01, weight average molecular weight: 112,000).

Synthesis Example 2

Synthesis of Polyimide (P-02)

Polyimide (P-02, weight average molecular weight: 105,000) was obtained in the same manner as in Synthesis Example 1 except that the amount of 2,3,5,6-tetramethylphenylenediamine of Synthesis Example 1 was changed to 4.075 g from 3.056 g and the amount of DABA was changed to 15.09 g from 16.04 g.

Synthesis Example 3

Synthesis of Polyimide (P-03)

Polyimide (P-03, weight average molecular weight: 9,500) was obtained in the same manner as in Synthesis Example 1 except that the amount of 2,3,5,6-tetramethylphenylenediamine was changed to 6.112 g from 3.056 g and the amount of DABA was changed to 13.20 g from 16.04 g in Synthesis Example 1.

[Preparation and Evaluation of Composite Membrane Using Polyimide Compound]

Example 1

Preparation of Composite Membrane 4 g of polyimide (P-01), 44 g of methyl ethyl ketone (manufactured by Wako Pure Chemical Industries, Ltd., product number: 024-15635), and 2.4 g of methyl isobutyl ketone (manufactured by Wako Pure Chemical Industries, Ltd., product number: 139-02086) were mixed with each other in a 100 mL brown vial bottle and then stirred for 60 minutes. The obtained solution was cast on a clean glass plate (thickness of 1000 μm) having a dimension of 10 cm² using a spin coater (manufactured by MIKASA CO., LTD., 1H-D7), and the plate was dried using an air-drier at 70° C. for 2 hours (hereinafter, the obtained laminate formed of the glass plate and the P-01 film was referred to as a "film-forming sheet 1a"). On the surface of the film-forming sheet 1a on the opposite side of the glass plate (that is, the surface of the P-01 film), double-sided tape (trade name: NICETACK, manufactured by Nichiban Co., Ltd.) was bonded to a portion of the outer peripheral portion thereof having a width of 5 mm, a PTFE sheet (thickness of 1000 μm, manufactured by Flon Chemical Inc.) having a dimension of 10 cm² was bonded to the double-sided tape, and then the surface was immersed in water. Only the glass plate was peeled off therefrom in water, the laminate formed of the PTFE sheet, the double-sided tape, and the P-01 film was taken out of water to stand still for a night, the laminate was subjected to a heat treatment at 250° C. for 1 hour using an inert oven (manufactured by IKEDA SCIENTIFIC Co., Ltd., STPH-201H), and then the film was insolubilized (hereinafter, the obtained laminate formed of the PTFE, the double-sided tape, and the P-01 film was referred to as a "film-forming sheet 1b"). On the surface of the film-forming sheet 1b on the opposite side of the PTFE sheet side (that is, the surface of the P-01 film), double-sided tape (trade name: NICETACK, manufactured by Nichiban Co., Ltd.) was bonded to a portion of the outer peripheral portion thereof having a width of 5 mm, a polyacrylonitrile porous film (thickness of 200 μm, manufactured by GMT Co., Ltd.) having a dimension of 10 cm² was bonded to the double-sided tape, and then the surface was immersed in water. Only the PTFE sheet was peeled off therefrom in water, and the laminate formed of the polyacrylonitrile porous film, the double-sided tape, the P-01 insoluble film, and the double-sided tape was taken out of water to stand still for a night, thereby obtaining a gas separation composite membrane (hereinafter, referred to as a composite membrane of Example 1). The thickness of the P-01 insoluble film was approximately 1 μm (the term "approximately" in the thickness of the insoluble film indicates a margin of error of ±0.2 μm, the same applies to hereinafter), and the thickness of the polyacrylonitrile porous film including non-woven fabric was approximately 200 μm. In addition, the molecular weight cut-off of the polyacrylonitrile was 100,000 or less, and the permeation rate of carbon dioxide in the polyacrylonitrile at 40° C. and 40 atm was 25000 GPU (the same applies to hereinafter).

Example 2

Preparation of Composite Membrane

A gas separation composite membrane (hereinafter, referred to as a composite membrane of Example 2) was obtained in the same manner as in Example 1 except that polyimide (P-02) was used in place of the polyimide (P-01) of Example 1. The thickness of the P-02 insoluble film was approximately 1 μm.

Example 3

Preparation of Composite Membrane

A gas separation composite membrane (hereinafter, referred to as a composite membrane of Example 3) was obtained in the same manner as in Example 1 except that polyimide (P-03) was used in place of the polyimide (P-01) of Example 1. The thickness of the P-03 insoluble film was approximately 1 μm.

Example 4

Preparation of Composite Membrane 4 g of polyimide (P-01), 44 g of methyl ethyl ketone, and 2.4 g of methyl isobutyl ketone were mixed with each other in a 100 mL brown vial bottle and then stirred for 60 minutes. The polyimide solution was cast on a clean glass plate having a dimension of 10 cm² using a spin coater, the plate was dried using an air-drier at 70° C. for 2 hours, and then the surface was immersed in water. Only the glass plate was peeled off therefrom in water, and the P-01 film was allowed to be scooped on the water surface. Next, the P-01 film was allowed to be scooped on the PTFE sheet to stand still for a night, the laminate was subjected to a heat treatment at 250° C. for 1 hour using an inert oven, and then the film was insolubilized (hereinafter, the laminate formed of the PTFE and the P-01 film was referred to as a "film-forming sheet 1c"). The film-forming sheet 1c was immersed in water, the PTFE sheet was peeled off therefrom in water, and the P-01 insoluble film was allowed to float on the water surface. The P-01 insoluble film was allowed to be scooped on the polyacrylonitrile porous film to stand still for a night, thereby obtaining a gas separation composite membrane (hereinafter, referred to as a composite membrane of Example 4). In this composite membrane, the thickness of the P-01 insoluble film was approximately 1 μm.

Comparative Example 1

Preparation of Composite Membrane

On the surface of the film-forming sheet 1a described in Example 1 on the opposite side of the glass plate side (that is, the surface of the P-01 film), double-sided tape was bonded to a portion of the outer peripheral portion thereof having a width of 5 mm, a polyacrylonitrile porous film having a dimension of 10 cm² was bonded to the double-sided tape, and then the surface was immersed in water. Only the glass plate was peeled off therefrom in water, and the laminate formed of the polyacrylonitrile porous film, the double-sided tape, and the P-01 insoluble film was taken out of water to stand still for a night, thereby obtaining a gas separation composite membrane (hereinafter, referred to as a composite membrane of Comparative Example 1). The thickness of the P-01 film was approximately 1 μm.

Comparative Example 2

Preparation of Composite Membrane

A composite membrane (hereinafter, referred to as a composite membrane of Comparative Example 2) was obtained in the same manner as in Example 1 except that the heat treatment of Example 1 were performed using an inert oven under the conditions of a temperature of 150° C. for 1 hour. In the obtained composite membrane, the thickness of the P-01 film was approximately 1 μm.

Comparative Example 3

Preparation of Single Membrane 7.5 g of polyimide (P-01), 42.5 g of methyl ethyl ketone (manufactured by Wako Pure Chemical Industries, Ltd., product number: 024-15635), and 2.4 g of methyl isobutyl ketone (manufactured by Wako Pure Chemical Industries, Ltd., product number: 139-02086) were mixed with each other in a 100 mL brown vial bottle and then stirred for 60 minutes. The obtained solution was cast on a clean glass plate having a dimension of 10 cm² using an applicator, and the plate was dried using an air-drier at 70° C. for 0.5 hours. The P-01 film was peeled off from the glass plate to obtain a gas separation membrane (single membrane) (hereinafter, referred to as a single membrane of Comparative Example 3). In the obtained single membrane, the thickness of the P-01 insoluble film was approximately 8 μm.

Comparative Example 4

Preparation of Composite Membrane 1.4 g of the polyimide (P-01) and 8.6 g of methyl ethyl ketone were mixed with each other in a 30 mL brown vial bottle and stirred for 30 minutes, 28 mg of 1-hydroxycyclohexyl phenyl ketone (manufactured by Sigma-Aldrich Co., LLC., product number: 405612) added thereto, and then the mixture was further stirred for 30 minutes. A polyacrylonitrile porous film was placed on a clean glass plate having a dimension of 10 cm², the polyimide solution was cast on the surface of the polyacrylonitrile porous film using an applicator, and then the surface was dried using an air-drier at 70° C. for 2 hours, thereby obtaining a gas separation composite membrane (hereinafter, referred to as a composite membrane of Comparative Example 4). The thickness of the polyimide film was approximately 0.1 μm.

Comparative Example 5

Preparation of Composite Membrane

A composite membrane obtained in the same manner as in Comparative Example 4 was subjected to a heat treatment using an inert oven at 250° C. for 1 hour (hereinafter, referred to as a composite membrane of Comparative Example 5).

Comparative Example 6

Preparation of Single Membrane 13.5 g of polyimide (trade name: P84, manufactured by HP Polymer Inc.) and 36.5 g of dimethylformamide (manufactured by Tokyo Chemical Industry Co., Ltd., product number: D0722) were mixed with each other in a 100 mL brown vial bottle and then stirred for 60 minutes. The polymer solution was cast on a clean glass plate having a dimension of 10 cm² using an applicator, and the plate was dried using an air-drier at 70° C. for 0.5 hours, further dried at 150° C. for 2 hours, and then dried at 250° C. for 12 hours. The polymer film was peeled off from the glass plate to obtain a gas separation membrane (single membrane) (hereinafter, referred to as a single membrane of Comparative Example 6). The thickness of the gas separation membrane was approximately 30 μm.

Comparative Example 7

Preparation of Composite Membrane 0.15 g of acetic acid cellulose (L-70, manufactured by Daicel Corporation) and 9.85 g of methylene chloride were mixed with each other in a 50 mL brown vial bottle and then stirred for 60 minutes. A polyacrylonitrile porous film was placed on a clean glass plate having a dimension of 10 cm², the acetic acid cellulose solution was cast on the surface of the polyacrylonitrile porous film using an applicator, the plate was covered with a lid made of polypropylene and allowed to stand still for a night, and the plate was dried using an air-drier at 70° C. for 2 hours, thereby obtaining a composite membrane (hereinafter, referred to as a composite membrane of Comparative Example 7). The thickness of the acetic acid cellulose film was approximately 0.1 μm.

Test Example 1

Solubility Test

Gas separation layers (polymer films such as polyimide) are peeled off from the gas separation composite membranes and the single membranes (these are collectively referred to as gas separation membranes) of respective Examples and Comparative Examples described above, 10 mg of the slices thereof and 10 g of dimethylacetamide were put into a vial bottle and stirred at 20° C. for 60 minutes, and the mixture was filtered through suction filtration using a PTFE hydrophilic filtration filter (manufactured by Merck Millipore, product number: FHLP04700). Residues remaining without being filtered were stored in vacuum at 175° C. for 5 hours, and the mass thereof was measured. The state in which the mass of residues was 0 mg or greater and less than 1 mg was determined as "dissolved," the state in which the mass of residues was 1 mg or greater and less than 8 mg was determined as "partially dissolved," and the state in which the mass of residues was 8 mg or greater and less than 10 mg was determined as "insoluble." In other words, the term "insoluble" indicates that the solubility in dimethylacetamide at 20° C. is 20 mg/100 g or less.

The results are listed in the following Table 1.

Test Example 2

Toluene Exposure Test

A 100 mL empty beaker was allowed to stand still in a glass container capable of covering a toluene solvent with a stretched lid, 0.05 g of slices of the gas separation membranes prepared in Examples and Comparative Examples were put into the beaker, and the glass container was covered with the lid to obtain a closed system. Thereafter, the container was stored in this state under a temperature condition of 40° C. for 5 hours, and the rates of change in mass (%) of the slices of the gas separation layers were calculated. The rate of change in mass (%) was calculated based on the following equation. The results are listed in the following Table 1.

Rate of change in mass (%)=100×{[mass of slices after storage in beaker at 40° C. for 5 hours]−[mass of slices before being put into beaker]}/[mass of slices before being put into beaker]

Test Example 3

Test of $CO_2$ Permeability and Gas Separation Selectivity

The gas separation selectivity and the $CO_2$ permeability of the gas separation membranes prepared in respective Examples and Comparative Examples described above were evaluated in the manner described below.

Permeation test samples were prepared by cutting the gas separation membranes such that the diameter of each membrane became 47 mm. Using a gas permeability measurement device manufactured by GTR Tec Corporation, mixed gas in which the volume ratio of carbon dioxide ($CO_2$) to methane ($CH_4$) was 20:80 (volume ratio) was adjusted and supplied such that the total pressure on the gas supply side became 5 MPa (partial pressure of $CO_2$: 1 MPa), the flow rate thereof became 500 mL/min, and the temperature thereof became 40° C. The gas that had been passed through was analyzed using gas chromatography. The gas permeabilities of the gas separation membranes were compared to each other by calculating gas permeation rates as gas permeability (Permeance).

The unit of gas permeability (gas permeation rate) was expressed by the unit of GPU [1 GPU=1×10$^{-6}$ cm$^3$ (STP)/cm$^2$·sec·cmHg], and then the evaluation was performed based on the following criteria.

—Evaluation Criteria of CO2 Permeation Rate—
A: 5 GPU or greater
B 0.1 GPU or greater and less than 5 GPU
C: less than 0.1 GPU Further, the gas separation selectivity was calculated as the ratio ($R_{CO2}/R_{CH4}$) of the permeation rate $R_{CH4}$ of $CH_4$ to the permeation rate $R_{CO2}$ of $CO_2$ of the gas separation membrane, and then evaluation was performed based on the following criteria. Even in a case where the temperature of supply gas was set to 20° C., the gas separation selectivity was measured in the same manner.

—Evaluation Criteria of Gas Separation Selectivity—
A: 40 or greater
B: 35 or greater and less than 40
C: less than 35

The results are listed in the following Table 1.

TABLE 1

| | Form of membrane | Solubility test | Toluene exposure test (rate of change in mass %) | $CO_2$ permeation rate | Gas separation selectivity (40° C.) | Gas separation selectivity (20° C.) |
|---|---|---|---|---|---|---|
| Example 1 | Composite membrane | Insoluble | 4.1 | A | A | A |
| Example 2 | Composite membrane | Insoluble | 4.0 | A | A | A |
| Example 3 | Composite membrane | Insoluble | 4.2 | A | A | A |
| Example 4 | Composite membrane | Insoluble | 4.1 | A | B | B |
| Comparative Example 1 | Composite membrane | Soluble | 24.5 | A | C | C |
| Comparative Example 2 | Composite membrane | Soluble | 23.0 | A | C | B |
| Comparative Example 3 | Single membrane | Soluble | 23.5 | C | A | A |
| Comparative Example 4 | Composite membrane | Soluble | 24.8 | A | C | C |

TABLE 1-continued

|  | Form of membrane | Solubility test | Toluene exposure test (rate of change in mass %) | $CO_2$ permeation rate | Gas separation selectivity (40° C.) | Gas separation selectivity (20° C.) |
|---|---|---|---|---|---|---|
| Comparative Example 5 | Composite membrane | Not measured | Not measured | — | — | — |
| Comparative Example 6 | Single membrane | Insoluble | Not measured | C | A | A |
| Comparative Example 7 | Composite membrane | Soluble | Not measured | A | C | C |

As listed in Table 1, the composite membranes of Comparative Examples 1, 2, 4, and 7 having a gas separation layer which does not contain an insoluble polyimide compound had inferior gas separation selectivity. Further, in the single membranes of Comparative Examples 3 and 6 respectively having a thickness of the gas separation layer larger than the thickness defined in the present invention, the $CO_2$ permeation rate was significantly degraded regardless of whether the insoluble polyimide compound was contained. Moreover, in the composite membrane of Comparative Example 5, the gas permeating support was melted, decomposed, and discolored due to the heating at 250° C., and thus the gas permeability was lost.

Meanwhile, the composite membranes of Examples 1 to 4 serving as the composite membranes of the present invention were excellent in both of the $CO_2$ permeation rate and the gas separation selectivity. It was shown that the composite membranes were unlikely to be swollen when exposed to toluene and were able to be used as gas separation membranes having excellent durability even in the presence of impurity components such as toluene. Although the gas separation selectivity of the composite membrane of Example 4 was in a practical level, but the gas separation selectivity thereof was slightly inferior to the composite membranes of Examples 1 to 3. It is assumed that wrinkles are generated on the gas separation layer and small film defects occur because the composite membrane of Example 4 does not have an adhesive layer between the gas permeating support and the gas separation layer.

[Preparation and Evaluation of Composite Membrane Using Polyimide Precursor]

Example 5

Preparation of Composite Membrane 28.8 g of a polyimide precursor varnish (U-IMIDE VARNISH BH, manufactured by Unitika Ltd.), and 71.2 g of dimethylacetamide (manufactured by Wako Pure Chemical Industries, Ltd., product number: 048-32355) were mixed with each other in a 100 mL brown vial bottle and then stirred for 20 minutes. The varnish solution was cast on a clean glass plate having a dimension of 10 cm² using a spin coater, and the plate was dried using an inert oven at 120° C. for 0.5 hours, at 200° C. for 0.5 hours, and at 350° C. for 1 hour, thereby forming an insoluble polyimide film (hereinafter, the obtained laminate formed of the glass plate and the insoluble polyimide film was referred to as a "film-forming sheet 2a"). On the surface of the film-forming sheet 2a on the opposite side of the glass plate (that is, the surface of the insoluble polyimide film), double-sided tape (trade name: NICETACK, manufactured by Nichiban Co., Ltd.) was bonded to a portion of the outer peripheral portion thereof having a width of 5 mm, a polyacrylonitrile porous film having a dimension of 10 cm² was bonded to the double-sided tape, and then the surface was immersed in water. Only the glass plate was peeled off therefrom in water, and the laminate formed of the polyacrylonitrile porous film, the double-sided tape, and the insoluble polyimide film was taken out of water to stand still for a night, thereby obtaining a gas separation composite membrane (hereinafter, referred to as a composite membrane of Example 5). The thickness of the insoluble polyimide film was approximately 0.5 μm.

Example 6

Preparation of Composite Membrane 55.6 g of a polyimide precursor varnish (U-IMIDE VARNISH AR, manufactured by Unitika Ltd.), and 44.4 g of N-methylpyrrolidone were mixed with each other in a 100 mL brown vial bottle and then stirred for 20 minutes. The varnish solution was cast on a clean glass plate having a dimension of 10 cm² using a spin coater, and the plate was dried using an inert oven at 120° C. for 0.5 hours, at 200° C. for 0.5 hours, and at 350° C. for 1 hour, thereby forming an insoluble polyimide film (hereinafter, the obtained laminate formed of the glass plate and the insoluble polyimide film was referred to as a "film-forming sheet 2b"). On the surface of the film-forming sheet 2b on the opposite side of the glass plate (that is, the surface of the insoluble polyimide film), double-sided tape (trade name: NICETACK, manufactured by Nichiban Co., Ltd.) was bonded to a portion of the outer peripheral portion thereof having a width of 5 mm, a polyacrylonitrile porous film having a dimension of 10 cm² was bonded to the double-sided tape, and then the surface was immersed in water. Only the glass plate was peeled off therefrom in water, and the laminate formed of the polyacrylonitrile porous film, the double-sided tape, and the insoluble polyimide film was taken out of water to stand still for a night, thereby obtaining a gas separation composite membrane (hereinafter, referred to as a composite membrane of Example 6). The thickness of the insoluble polyimide film was approximately 0.5 μm.

Example 7

Preparation of Composite Membrane 27.8 g of a polyimide precursor varnish (U-IMIDE VARNISH C, manufactured by Unitika Ltd.), and 72.2 g of dimethylacetamide were mixed with each other in a 100 mL brown vial bottle and then stirred for 20 minutes. The varnish solution was cast on a clean glass plate having a dimension of 10 cm² using a spin coater, and the plate was dried using an inert oven at 120° C. for 0.5 hours, at 200° C. for 0.5 hours, and at 300° C. for 1 hour, thereby forming an insoluble polyimide film (hereinafter, the obtained laminate formed of the glass plate and the insoluble polyimide film was referred to as a "film-forming sheet 2c"). On the surface of the film-forming sheet 2c on the opposite side of the glass plate (that is, the surface of the insoluble polyimide film), double-sided tape (trade name: NICETACK, manufactured by Nichiban Co., Ltd.) was bonded to a portion of the outer peripheral portion thereof having a width of 5 mm, a polyacrylonitrile porous film having a dimension of 10 cm$^2$ was bonded to the double-sided tape, and then the surface was immersed in water. Only the glass plate was peeled off therefrom in water, and the laminate formed of the polyacrylonitrile porous film, the double-sided tape, and the insoluble polyimide film was taken out of water to stand still for a night, thereby obtaining a gas separation composite membrane (hereinafter, referred to as a composite membrane of Example 7). The thickness of the insoluble polyimide film was approximately 0.5 μm.

Comparative Example 8

Preparation of Single Membrane

A polyimide precursor varnish (U-IMIDE VARNISH BH, manufactured by Unitika Ltd.) was cast on a clean glass plate having a dimension of 10 cm$^2$ using an applicator, and the plate was dried in a nitrogen atmosphere using an inert oven at 350° C. for 1 hour, thereby forming an insoluble polyimide film. The film was immersed in water, the glass plate was peeled off therefrom, and the insoluble polyimide film was taken out of water to stand still for a night, thereby obtaining a gas separation membrane (single membrane) (hereinafter, referred to as a single membrane of Comparative Example 8). The thickness of the single membrane was approximately 15 μm.

The solubilities, the $CO_2$ permeabilities (40° C.), and the gas separation selectivities (40° C. and 20° C.) of the obtained gas separation membranes were tested in the same manner as described above.

The results are listed in the following Table 2.

TABLE 2

| | Form of membrane | Solubility test | $CO_2$ permeation rate | Gas separation selectivity (40° C.) | Gas separation selectivity (20° C.) |
|---|---|---|---|---|---|
| Example 5 | Composite membrane | Insoluble | A | A | A |
| Example 6 | Composite membrane | Insoluble | A | A | A |
| Example 7 | Composite membrane | Insoluble | A | A | A |
| Comparative Example 8 | Single membrane | Insoluble | — | — | — |

The single membrane of Comparative Example 8 whose gas separation layer formed of an insoluble polyimide film had a thickness larger than the thickness defined in the present invention did not almost exhibit the gas permeability, and permeating gas was not able to be detected.

Meanwhile, the composite membranes of Examples 5 to 7 serving as the composite membranes of the present invention were excellent both in the $CO_2$ permeability and gas separation selectivity.

The present invention has been described with reference to embodiments, but any detailed description of the invention is not intended to be limited unless otherwise specified. The appended claims should be broadly interpreted within the range not departing from the spirit and the scope of the invention.

EXPLANATION OF REFERENCES

10: gas separation composite membrane
20: laminate formed of gas permeating support, adhesive layer, gas separation layer, and heat-resistant support from top
1: gas permeating support
2: adhesive layer
3: gas separation layer
4: heat-resistant support

What is claimed is:

1. A gas separation composite membrane comprising:
   a gas separation layer which is formed to include a polyimide compound insolubilized through a heat treatment at 200° C. or higher on the upper side of a gas permeating support,
   wherein the solubility of the insolubilized polyimide compound in dimethylacetamide at 20° C. is 20 mg/100 g or less, and
   the thickness of the gas separation layer is 0.1 μm or greater and less than 5.0 μm.

2. The gas separation composite membrane as claimed in claim 1, further comprising an adhesive layer on at least a portion between the gas separation layer and the gas permeating support.

3. The gas separation composite membrane as claimed in claim 1, wherein the gas permeating support is an organic porous support.

4. The gas separation composite membrane as claimed in claim 1, wherein the gas separation composite membrane allows carbon dioxide to selectively permeate from gas containing carbon dioxide and methane.

5. A gas separation module comprising the gas separation composite membrane as claimed in claim 1.

6. A gas separation device comprising the gas separation module as claimed in claim 5.

7. A gas separation method comprising: allowing carbon dioxide to selectively permeate from gas containing carbon dioxide and methane using the gas separation membrane as claimed in claim 1.

* * * * *